(12) United States Patent
Ohashi

(10) Patent No.: US 9,385,602 B2
(45) Date of Patent: Jul. 5, 2016

(54) SWITCHING POWER SUPPLY DEVICE

(71) Applicant: FUJI ELECTRIC CO., LTD., Kawasaki-shi (JP)

(72) Inventor: Hidetomo Ohashi, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 127 days.

(21) Appl. No.: 14/484,885

(22) Filed: Sep. 12, 2014

(65) Prior Publication Data

US 2014/0376281 A1 Dec. 25, 2014

Related U.S. Application Data

(63) Continuation of application No. PCT/JP2013/072478, filed on Aug. 22, 2013.

(30) Foreign Application Priority Data

Aug. 27, 2012 (JP) ................................ 2012-187072

(51) Int. Cl.
*H02M 3/158* (2006.01)
*H02M 3/335* (2006.01)
*H02M 1/38* (2007.01)
*H02M 1/00* (2006.01)
*H02M 1/08* (2006.01)

(52) U.S. Cl.
CPC .......... *H02M 3/158* (2013.01); *H02M 3/33523* (2013.01); *H02M 3/33553* (2013.01); *H02M 1/08* (2013.01); *H02M 1/38* (2013.01); *H02M 3/33569* (2013.01); *H02M 2001/0022* (2013.01); *H02M 2001/0025* (2013.01)

(58) Field of Classification Search
CPC ........... H02M 3/28; H02M 1/08; H02M 1/38; H02M 3/155; H02M 3/158; H02M 3/335; H02M 3/33523; H02M 3/33553; H02M 3/33569; H02M 2001/0025; H02M 2001/0022
USPC .................. 323/259, 271, 282–284, 350, 351
See application file for complete search history.

(56) References Cited

U.S. PATENT DOCUMENTS

| | | | |
|---|---|---|---|
| 5,886,884 A | 3/1999 | Baek et al. | |
| 7,391,194 B2 | 6/2008 | Brown | |
| 8,085,024 B2 * | 12/2011 | Prodic | H02M 3/157 323/283 |
| 2001/0036085 A1 | 11/2001 | Narita | |

(Continued)

FOREIGN PATENT DOCUMENTS

| | | |
|---|---|---|
| JP | 2001-258269 A | 9/2001 |
| JP | 2007-110845 A | 4/2007 |

(Continued)

*Primary Examiner* — Gary L Laxton
*Assistant Examiner* — Kyle J Moody
(74) *Attorney, Agent, or Firm* — Rabin & Berdo, P.C.

(57) ABSTRACT

A switching power supply device wherein an input voltage is stepped-up by first and second switching elements that are driven on and off in a complementary way, thus obtaining a stabilized output voltage. The switching power supply device includes a comparator that detects fluctuation in an operating reference potential of the second switching element accompanying fluctuation in the input voltage, and a drive signal generator circuit that carries out a logical operation on an output control signal, a dead time signal, and the output signal of the comparator, thus generating first and second drive signals that determine the on-state time of the first and second switching elements.

6 Claims, 18 Drawing Sheets

(56) References Cited

U.S. PATENT DOCUMENTS

| | | | |
|---|---|---|---|
| 2007/0159150 A1* | 7/2007 | Hosokawa | H02M 3/1588 323/285 |
| 2010/0060254 A1* | 3/2010 | Tokura | H02M 3/158 323/299 |
| 2012/0033456 A1 | 2/2012 | Koike et al. | |
| 2012/0256671 A1 | 10/2012 | Xu et al. | |

FOREIGN PATENT DOCUMENTS

| | | |
|---|---|---|
| JP | 2007-535286 A | 11/2007 |
| JP | 2012-034549 A | 2/2012 |
| WO | WO-2012/016401 A1 | 2/2012 |

* cited by examiner

US 9,385,602 B2

SWITCHING POWER SUPPLY DEVICE

CROSS-REFERENCE TO RELATED APPLICATIONS

This application is a continuation application of International Application number PCT/JP2013/072478, which was filed on Aug. 22, 2013 and which designated the United States. Furthermore, this application claims the benefit of foreign priority of Japanese application 2012-187072, filed on Aug. 27, 2012. The disclosures of these earlier applications are hereby incorporated herein by reference.

TECHNICAL FIELD

The present invention relates to a switching power supply device with which an increase in power conversion efficiency is obtained.

BACKGROUND ART

A resonance type converter is known as a switching power supply device for various kinds of electronic instrument. The resonance type converter is configured by a primary coil of an insulating transformer being connected via a capacitor to a direct current voltage supply. A series resonant circuit is formed of a leakage inductor of the insulating transformer and the capacitor. The resonance type converter controls resonance current flowing through the series resonant circuit using first and second switching elements driven on and off in a complementary way, obtaining stepped-up or stepped-down direct current voltage from a secondary coil side of the insulating transformer.

For example, soft switching technology for this kind of switching power supply device is proposed in PTL 1 and 2. The soft switching technology is such that loss in the switching elements is considerably reduced by the switching elements being turned off when the voltage applied to each of the switching elements is zero (0), or when the current flowing through the inductor is zero (0).

This resonance type switching power supply device 1, in outline, is such that a primary coil P1 of an insulating transformer T is connected via a capacitor C to a direct current voltage supply B, and includes a series resonant circuit formed of a leakage inductor of the insulating transformer T and the capacitor C, as shown in, for example, FIG. 12. A first switching element Q1 connected in series to the primary coil P1 of the insulating transformer T is driven on by a drive control circuit A that carries out a separately-excited oscillation operation, and applies an input voltage Vin from the direct current voltage supply B to the series resonant circuit. The drive control circuit A is formed of, for example, a power supply IC. Also, a second switching element Q2 connected in parallel to the series resonant circuit is driven on by the drive control circuit A when the first switching element Q1 is in an off-state, thus forming a resonance current path of the series resonant circuit. The first and second switching elements Q1 and Q2 are formed of, for example, high breakdown voltage n-type MOSFETs.

Power generated in secondary coils S1 and S2 of the insulating transformer T is rectified and smoothed via an output circuit formed of diodes D1 and D2 and an output capacitor Cout, and supplied as an output voltage Vout to an unshown load. A resonance type power conversion device main body is structured of these circuit portions. Further, the output voltage Vout, specifically the deviation between the output voltage Vout and an output voltage setting value, is detected by an output voltage detector circuit Vos, and fed back as an FB voltage to the drive control circuit A via a photocoupler PC.

The FB voltage fed back to the drive control circuit A is used in pulse width modulation of output control signals that drive the first and second switching elements Q1 and Q2 on and off, whereby the output voltage Vout is stabilized. Direct current power supplied from the direct current voltage supply B is generally filtered via an input capacitor Cin, and subsequently fed as the input voltage Vin to the switching power supply device.

Herein, the drive control circuit A is configured mainly of an output control circuit 2, a dead time circuit 3, and a drive signal generator circuit 4, as in a schematic configuration thereof shown in, for example, FIG. 13. Furthermore, the drive control circuit A includes a drive amplifier 5 as a drive circuit that drives the first switching element Q1 and a drive circuit 6 as a drive circuit that drives the second switching element Q2. In FIG. 13, 7 is a level shifter circuit for shifting the level of a drive signal generated by the drive signal generator circuit 4, and inputting the drive signal into the drive circuit 6. Also, 8 is an internal power supply circuit that generates voltage VDD necessary for operations of the output control circuit 2, the dead time circuit 3, and the drive signal generator circuit 4 from a drive voltage VCC applied to the drive control circuit A.

The output control circuit 2, for example, generates a PWM signal having a pulse width in accordance with the FB voltage fed back from the output voltage detector circuit Vos as an output control signal CO. The on-state periods of the first and second switching elements Q1 and Q2 are prescribed by the output control signal CO, and the output voltage Vout accompanying switching operations of the switching elements Q1 and Q2 is controlled so as to be of the output voltage setting value. The output control circuit 2 may also be such as to generate a PFM signal having a frequency in accordance with the FB voltage as the output control signal CO, instead of the PWM signal.

The dead time circuit 3 includes a charge/discharge capacitor $3c$, charged by a constant current supply $3b$ via a charge switch $3a$, and a discharge switch $3d$ that discharges a charge accumulated in the charge/discharge capacitor $3c$, for example, as shown in FIG. 14. The charge switch $3a$ and discharge switch $3d$ are formed of, for example, a p-type MOSFET and an n-type MOSFET. The charge switch $3a$ and discharge switch $3d$ are controlled so as to be turned on and off in a complementary way by the output control signal CO output from the output control circuit 2.

Furthermore, the dead time circuit 3 includes a comparator $3e$ that compares a charge/discharge voltage Vcd of the charge/discharge capacitor $3c$ with a preset threshold value voltage Vdt, and inverts when the charge/discharge voltage Vcd exceeds the threshold value voltage Vdt. Further, by a logical operation being carried out on the output of the comparator $3e$ and the output control signal CO in a NOR circuit $3f$, a dead time signal DT of a constant pulse width Tdt is generated. The dead time signal DT is a timing adjustment signal for turning on the switching elements Q1 and Q2 when the voltage applied to the first and second switching elements Q1 and Q2 is zero (0).

Meanwhile, the drive signal generator circuit 4 and level shifter circuit 7 are configured as shown in, for example, FIG. 15. That is, the drive signal generator circuit 4 is formed of a logic circuit that generates pulse width controlled drive signals DH and DL, which drive on the first and second switching elements Q1 and Q2 respectively, in accordance with the dead time signal DT and output control signal CO. Specifically, the drive signal generator circuit 4 is such that a logical operation is carried out on the output control signal CO and dead time signal DT in a NOR circuit 4a, whereby the low side drive signal DL for driving the first switching element Q1 is generated. Also, the drive signal generator circuit 4 is such that, at the same time, a logical operation is carried out on the dead time signal DT, inverted via an inverter circuit 4b, and the output control signal CO in an AND circuit 4c, whereby the high side drive signal DH for driving the second switching element Q2 is generated.

Herein, the second switching element Q2 carries out a switching operation under a condition of a high voltage being applied to the primary coil P1 of the insulating transformer T. Also, the drive circuit 6 is configured so as to operate between a high voltage VB applied to the primary coil P1 and an operating reference voltage VS of the second switching element Q2, as shown in FIG. 13, in accordance with the operating voltage of the second switching element Q2. As opposed to this, the drive signal generator circuit 4 is configured so as to operate, for example, between the operating reference voltage VS and a ground potential. Therefore, the level shifter circuit 7 performs a role of shifting the level of the drive signal DH output by the drive signal generator circuit 4 to coincide with the operating reference voltage VS of the drive circuit 6.

The level shifter circuit 7, in outline, includes level shifting first and second transistors 7c and 7d formed of n-type MOSFETs whose drains are connected via load resistors 7a and 7b to the high voltage VB. Also, the level shifter circuit 7 includes a first rising edge trigger circuit 7e, which outputs a pulse signal PS at the timing at which the drive signal DH rises, and a second rising edge trigger circuit 7g which, by the drive signal DH being inverted via an inverter circuit 7f, outputs a pulse signal PE at the timing at which the drive signal DH falls.

The first and second rising edge trigger circuits 7e and 7g drive the transistors 7c and 7d respectively using the pulse signals PS and PE, which are the outputs of the first and second rising edge trigger circuits 7e and 7g. As a result of this, pulse signals PShigh and PEhigh, synchronized with the timings of the rise and fall respectively of the drive signal DH and level-shifted to a high potential, are obtained as drain voltages of the transistors 7c and 7d respectively, as shown in FIG. 16. By the output circuit 7h, which structures a flip-flop, being set and reset by the pulse signals PShigh and PEhigh, the drive signal DH is level-shifted and reproduced as the output of the output circuit 7h. In this way, the level-shifted drive signal DH is applied to the drive circuit 6, whereby the second switching element Q2 is driven on and off. 7i and 7j in FIG. 15 are recovery diodes connected in anti-parallel to the load resistors 7a and 7b.

Herein, a simple description will be given of an operation of a resonance type converter, which is the switching power supply device with the heretofore described configuration. The resonance type converter is such that, by the first switching element Q1 being turned on when the second switching element Q2 is in an off-state, current flows through the series resonant circuit. When the first switching element Q1 is turned off in this state, an unshown parasitic capacitor of the first switching element Q1 is charged by current flowing through an inductor of the series resonant circuit. At the same time, an unshown parasitic capacitor of the second switching element Q2 is discharged by the current.

Further, by the second switching element Q2 being turned on when the charge voltage of the parasitic capacitor of the first switching element Q1 reaches the input voltage Vin, zero voltage switching of the second switching element Q2 is realized. In accompaniment to the second switching element Q2 being turned on, electric power energy stored in the capacitor C now flows via the second switching element Q2. Consequently, the current flowing through the inductor of the series resonant circuit is inverted.

When the second switching element Q2 is subsequently turned off, the parasitic capacitor of the second switching element Q2 is now charged by the current inverted as previously described. At the same time, the parasitic capacitor of the first switching element Q1 is discharged by the current. Further, by the first switching element Q1 being turned on when the charge voltage of the parasitic capacitor of the second switching element Q2 reaches zero (0) voltage, zero voltage switching of the first switching element Q1 is realized. By the first switching element Q1 being turned on, the current of the series resonant circuit is inverted, and flows via the first switching element Q1 again. The previously described dead time signal, with the timing at which one of these kinds of first and second switching elements Q1 and Q2 is turned off as a reference, is used for prescribing the timing at which the other of the switching elements Q1 and Q2 is turned on. cl CITATION LIST Patent Literature PTL 1: U.S. Pat. No. 5,886,884
PTL 2: U.S. Pat. No. 7,391,194

SUMMARY OF INVENTION

Technical Problem

However, the delay time between the switching element Q1 (Q2) being turned off and the voltage applied to the switching element Q2 (Q1) reaching zero (0) depends exclusively on the parasitic capacitance of the switching elements Q1 and Q2 and the input voltage Vin. In response to this, as previously described, the pulse width Tdt of the dead time signal is fixedly determined in accordance with the capacitance of the charge/discharge capacitor 3c, the charge current of the charge/discharge capacitor 3c, and the threshold value voltage Vdt set in the comparator 3e.

Meanwhile, it may happen that the input voltage Vin varies due to temporal change, variation in the characteristics, or the like, of parts configuring the switching power supply device, in accompaniment to which the drain voltage when the first switching element Q1 is turned off varies, because of which the operating reference potential VS of the second switching element Q2 varies. Therefore, it cannot be denied that, in accompaniment to the variation in the operating reference potential VS, deviation occurs between the timing at which the voltage applied to the first and second switching elements Q1 and Q2 reaches zero (0) and the timing at which the first and second switching elements Q1 and Q2 are driven on in accordance with the dead time signal.

Specifically, when the operating reference potential VS is lower than a voltage prescribed based on the specifications, the charge/discharge time of the parasitic capacitors of the switching elements Q1 and Q2 decreases in accompaniment thereto. Therefore, the switching elements Q1 and Q2 are driven on after the timing at which the voltage applied to the switching elements Q1 and Q2 reaches zero (0), as shown in, for example, FIG. 17. As ineffective time during power conversion increases as a result of this, the current peak is extended, loss in the switching elements Q1 and Q2 increases, and power conversion efficiency decreases.

Conversely, when the operating reference potential VS is higher than a voltage prescribed based on the specifications, the charge/discharge time of the parasitic capacitors of the switching elements Q1 and Q2 increases in accompaniment thereto. Therefore, the dead time signal dissipates, and the switching elements Q1 and Q2 are driven on, before the voltage being applied to the switching elements Q1 and Q2 reaches zero (0), as shown in, for example, FIG. 18. As a result of this, zero voltage switching is no longer possible, loss in the switching elements Q1 and Q2 increases, and power conversion efficiency decreases.

The invention, having been contrived considering this kind of situation, has an object of providing a switching power supply device with a simple configuration such that it is possible to appropriately set the timing of the turning on of the first and second switching elements regardless of fluctuation in the operating reference potential VS, thus realizing zero voltage switching, and preventing a decrease in power conversion efficiency.

Solution to Problem

The invention, focusing on the fact that deviation in the timing of the turning on of the first and second switching elements caused by fluctuation in the input voltage Vin is caused exclusively by fluctuation in the operating reference potential VS at which the second switching element Q2 carries out a switching operation, is characterized by correcting the timing of the turning on of the first and second switching elements by detecting the amount of fluctuation in the operating reference potential VS.

Therefore, in order to achieve the heretofore described object, a switching power supply device according to the invention basically includes a resonance type power conversion device main body wherein direct current output power is obtained by direct current input power being switched and stored in an inductor by a first switching element and the power stored in the inductor being transferred, utilizing the resonance of the inductor, to an output capacitor by a second switching element, a drive control circuit that causes the inductor to resonate by alternately driving the first and second switching elements on, and a feedback circuit that detects the output voltage of the output capacitor and returns the detection information to the drive control circuit, thus controlling the operation of the drive control circuit.

In particular, the switching power supply device according to the invention is characterized in that the drive control circuit is configured to include a comparator that detects fluctuation in an operating reference potential of the second switching element accompanying fluctuation in the input voltage, an output control circuit that generates an output control signal of a pulse width in accordance with the detection information returned from the feedback circuit, a dead time circuit that, with the timing at which one of the first and second switching elements is turned off based on the output control signal as a reference, generates a dead time signal that prescribes the timing at which the other switching element is turned on, a drive signal generator circuit that carries out a logical operation on the output control signal and the dead time signal and the output signal of the comparator, and generates first and second drive signals that prescribe the on-state time of the first and second switching elements respectively, a level shifter circuit that shifts the level of the second drive signal in accordance with the operating reference potential of the second switching element, a first drive circuit that receives the first drive signal and drives the first switching element, and a second drive circuit that receives the second drive signal whose level has been shifted by the level shifter circuit and drives the second switching element.

Herein, the resonance type power conversion device main body is formed of, for example, a resonance type inverter including a series resonant circuit, wherein a primary coil of an insulating transformer is connected via a capacitor to a direct current voltage supply, formed of a leakage inductor of the insulating transformer and the capacitor, a first switching element, driven by the drive control circuit, that applies input voltage from the direct current voltage supply to the series resonant circuit when in an on-state, a second switching element connected in parallel to the series resonant circuit and driven on by the drive control circuit when the first switching element is in an off-state, thus forming a current path of the series resonant circuit, a diode that rectifies power generated on a secondary coil side of the insulating transformer, and an output capacitor that smoothes and outputs the power rectified via the diode.

Alternatively, the resonance type power conversion device main body is formed of, for example, a synchronous rectification step-up converter including a first switching element, connected via a resonance reactor to a direct current voltage supply and driven by the drive control circuit, that applies input voltage from the direct current voltage supply to the resonance reactor when in an on-state, and a second switching element, driven on by the drive control circuit when the first switching element is in an off-state, that transfers electric power energy accumulated in the resonance reactor to an output capacitor.

Preferably, the comparator is formed of a Schmitt trigger type, which switches the output thereof to "H" when the operating reference potential of the second switching element exceeds a first threshold value and switches the output thereof to "L" when the operating reference potential of the second switching element drops below a second threshold value set lower than the first threshold value.

Further, the output signal generator circuit is configured so as to, when the output signal of the comparator is at "L", generate a first output signal of a pulse width having the fall of the dead time signal as a turn-on trigger and the rise of the output control signal as a turn-off trigger, and generate a second output signal of a pulse width having the fall of the output signal of the comparator as a turn-on trigger and the rise of the output control signal as a turn-off trigger.

Also, at the same time, it is preferable that the output signal generator circuit is configured so as to, when the output signal of the comparator is at "H", generate a first output signal of a pulse width having the rise of the output signal of the comparator as a turn-on trigger and the rise of the output control signal as a turn-off trigger, and generate a second output signal of a pulse width having the fall of the output signal of the comparator as a turn-on trigger and the rise of the output control signal as a turn-off trigger.

Also, it is also preferable that the level shifter circuit is configured to include, for example, first and second MOSFETs that shift the level of pulse signals indicating the timing of the rise and fall of the second drive signal, thus transferring the logic. In this case, the comparator is configured so as to select the gate voltage of one of the first and second MOSFETs, which fluctuates in accompaniment to fluctuation in the operating reference potential of the second switching element, via an analog switch selectively driven in accordance with the second drive signal. Further, it is preferable that the comparator is configured to compare the selected gate voltage with the first and second threshold values, and invert the output thereof.

Also, the comparator may be configured so as to compare a voltage that is the operating reference potential of the second switching element divided by resistors or capacitors with the first and second threshold values, and invert the output thereof.

Advantageous Effects of Invention

According to the switching power supply device with the heretofore described configuration, the output timing of the drive signals output by the drive signal generator circuit is adjusted in accordance with the output signal of the comparator, which carries out an inversion operation in accordance with the amount of fluctuation in the operating reference potential of the second switching element. In particular, the switching power supply device according to the invention determines the timing at which the first and second switching elements are turned on by utilizing the output of the comparator. Herein, the output of the comparator is inverted at a point at which the operating reference potential of the second switching element fluctuates from a voltage prescribed based on the specifications, and the amount of the fluctuation exceeds the first or second threshold value. Consequently, according to the switching power supply device according to the invention, it is possible to reliably turn on the first and second switching elements at the timing at which the voltage applied to the relevant switching element reaches zero (0), regardless of fluctuation in the operating reference potential VS of the second switching element accompanying fluctuation in the input voltage Vin. As a result of this, it is possible to reduce loss in the switching elements, thus increasing the power conversion efficiency thereof.

DESCRIPTION OF EMBODIMENTS

Figure 1:
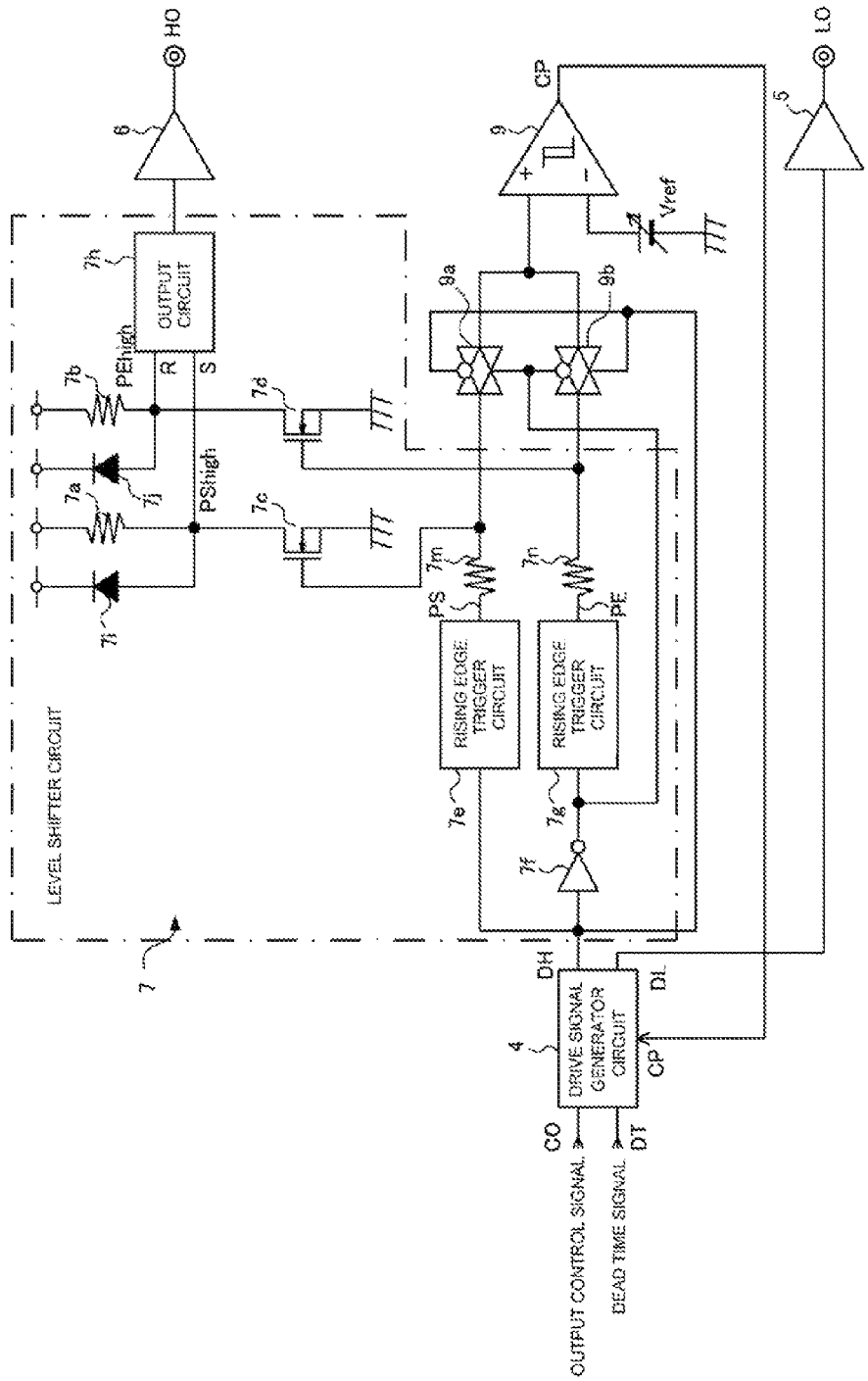
FIG. 1 is a diagram wherein a characteristic configuration of a switching power supply device according to a first embodiment of the invention is extracted, showing a level shifter circuit in a drive control circuit, and peripheral circuits thereof.

Hereafter, referring to the drawings, a description will be given of a switching power supply device structuring a resonance type inverter according to embodiments of the invention.

Figure 12:
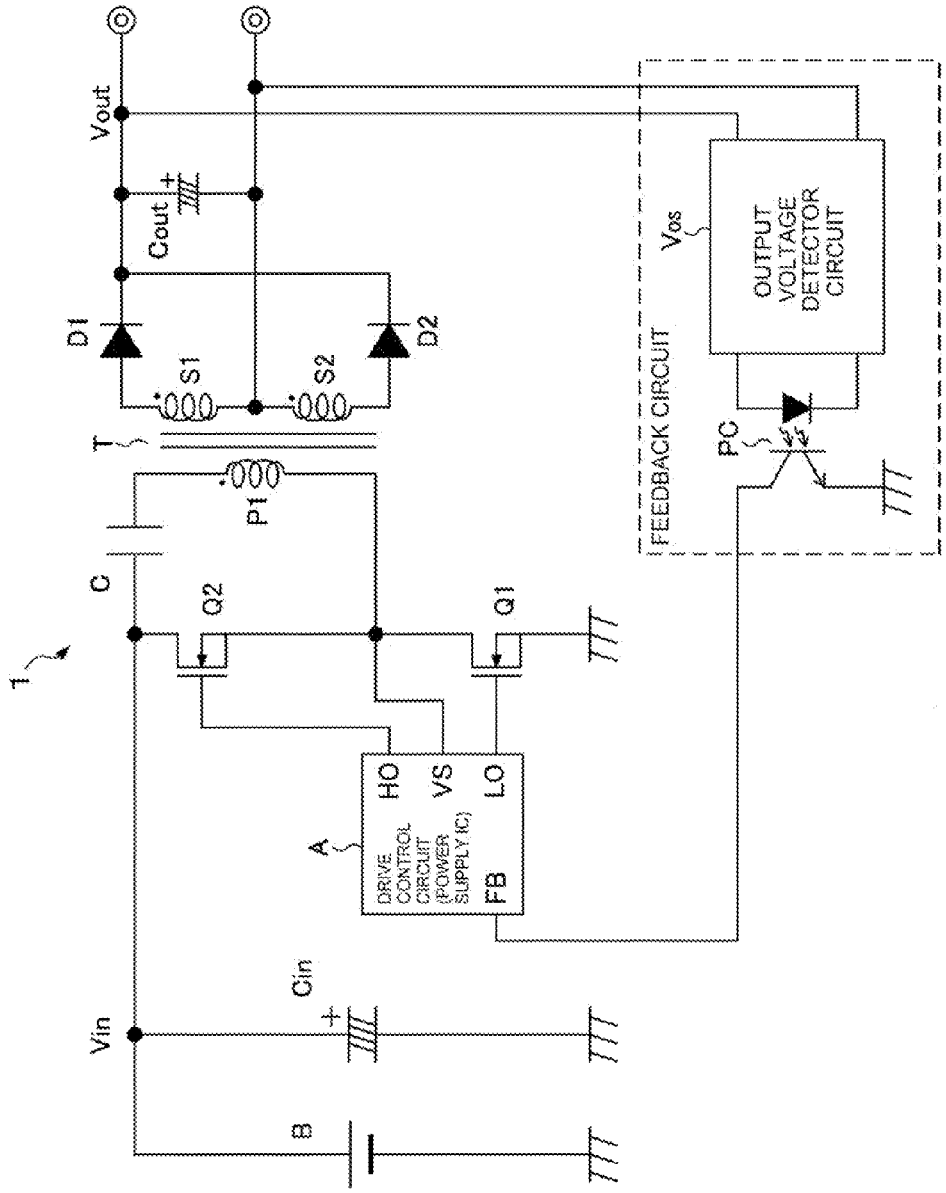
FIG. 12 is a schematic configuration diagram of a heretofore known general resonance type switching power supply device.
Figure 13:
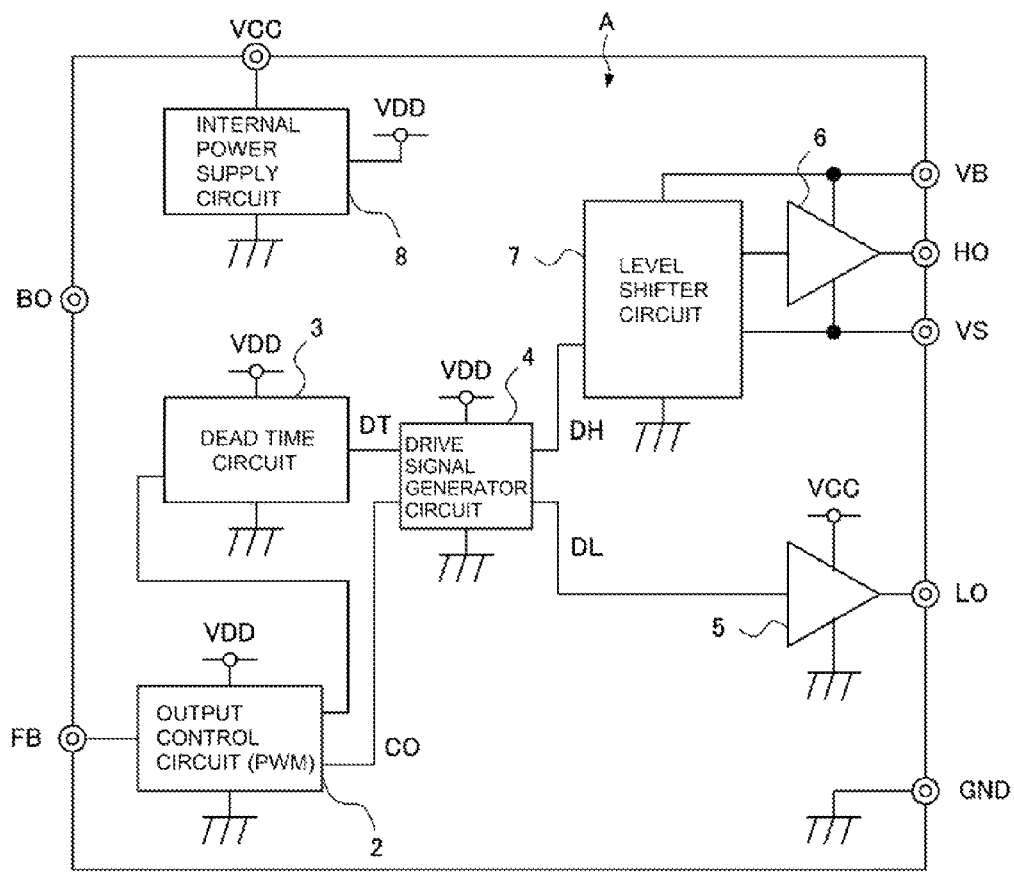
FIG. 13 is a diagram showing a schematic configuration of a drive control circuit in the switching power supply device shown in FIG. 11.
Figure 14:
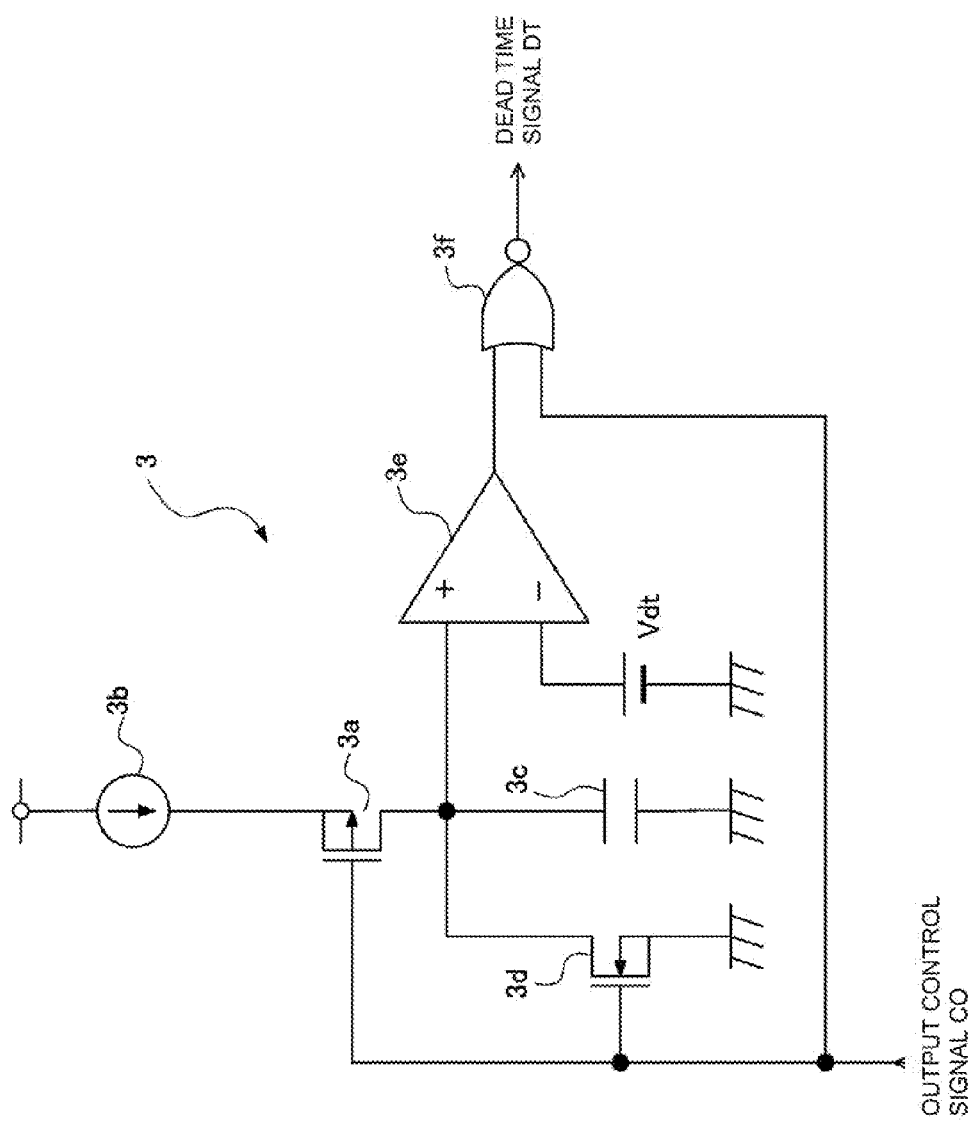
FIG. 14 is a diagram showing a configuration example of a dead time circuit in the drive control circuit shown in FIG. 13.

The switching power supply device according to the embodiments is configured overall in the same way as a switching power supply device shown in FIG. 12. Also, a drive control circuit A that drives first and second switching elements Q1 and Q2 on and off is basically configured in the same way as a drive control circuit A shown in FIG. 13. Consequently, unnecessary repetitive descriptions of the overall configuration of the switching power supply device and the basic configuration of the drive control circuit A will be omitted.

The switching power supply device according to a first embodiment of the invention is characterized in that, as shown by the configuration of a level shifter circuit 7 and peripheral circuits thereof in FIG. 1, there is provided a comparator 9, associated with the level shifter circuit 7, that detects fluctuation in an operating reference potential VS of the second switching element Q2. Specifically, the switching power supply device is characterized in that there is provided the comparator 9, which compares the gate voltages of first and second transistors 7c and 7d, formed of level shift MOSFETs, in the level shifter circuit 7 with a first threshold value Vth1 and second threshold value Vth2 (>Vth1) prescribed by a preset reference voltage Vref, and carries out an inverting operation.

Further, the switching power supply device is characterized by being configured so that an output signal CP of the comparator 9 is provided to the drive signal generator circuit 4, and each of drive signals DH and DL are generated. Specifically, the switching power supply device is characterized in that, in a drive signal generator circuit 4, each of the high side drive signal DH and low side drive signal DL is generated based on the output signal CP of the comparator 9 in addition to an output control signal CO and a dead time signal DT, as shown in, for example, FIG. 3.

Figure 15:
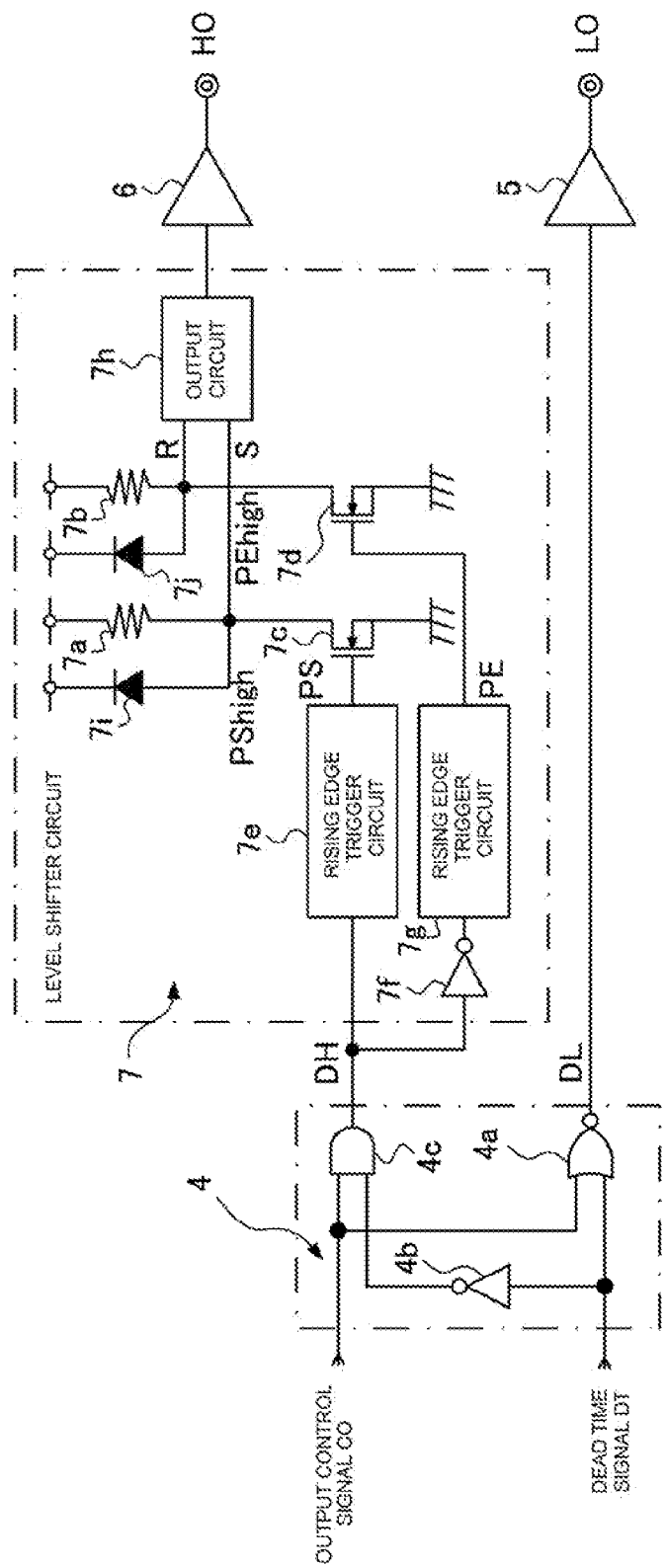
FIG. 15 is a diagram showing a configuration of a level shifter circuit in the drive control circuit shown in FIG. 13, and peripheral circuits thereof.
Figure 16:
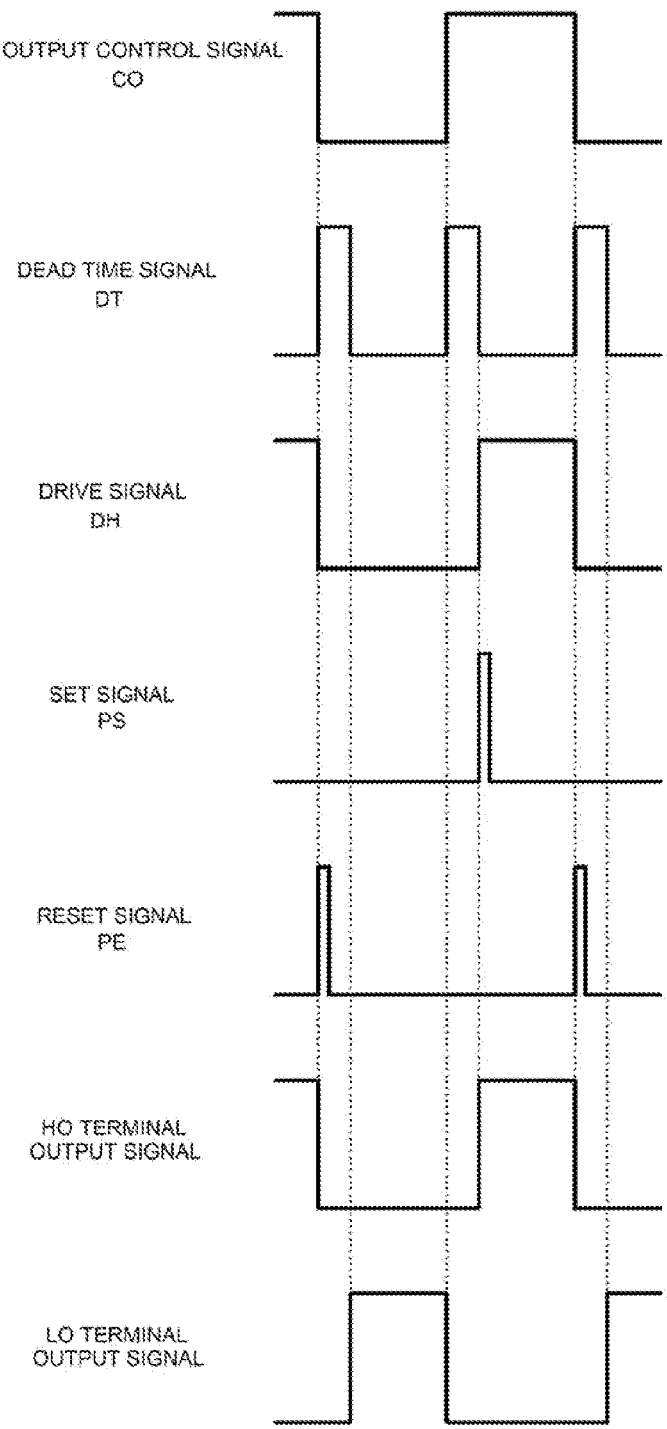
FIG. 16 is a signal waveform diagram for illustrating an operation of a drive control circuit shown in FIG. 11.
Figure 17:
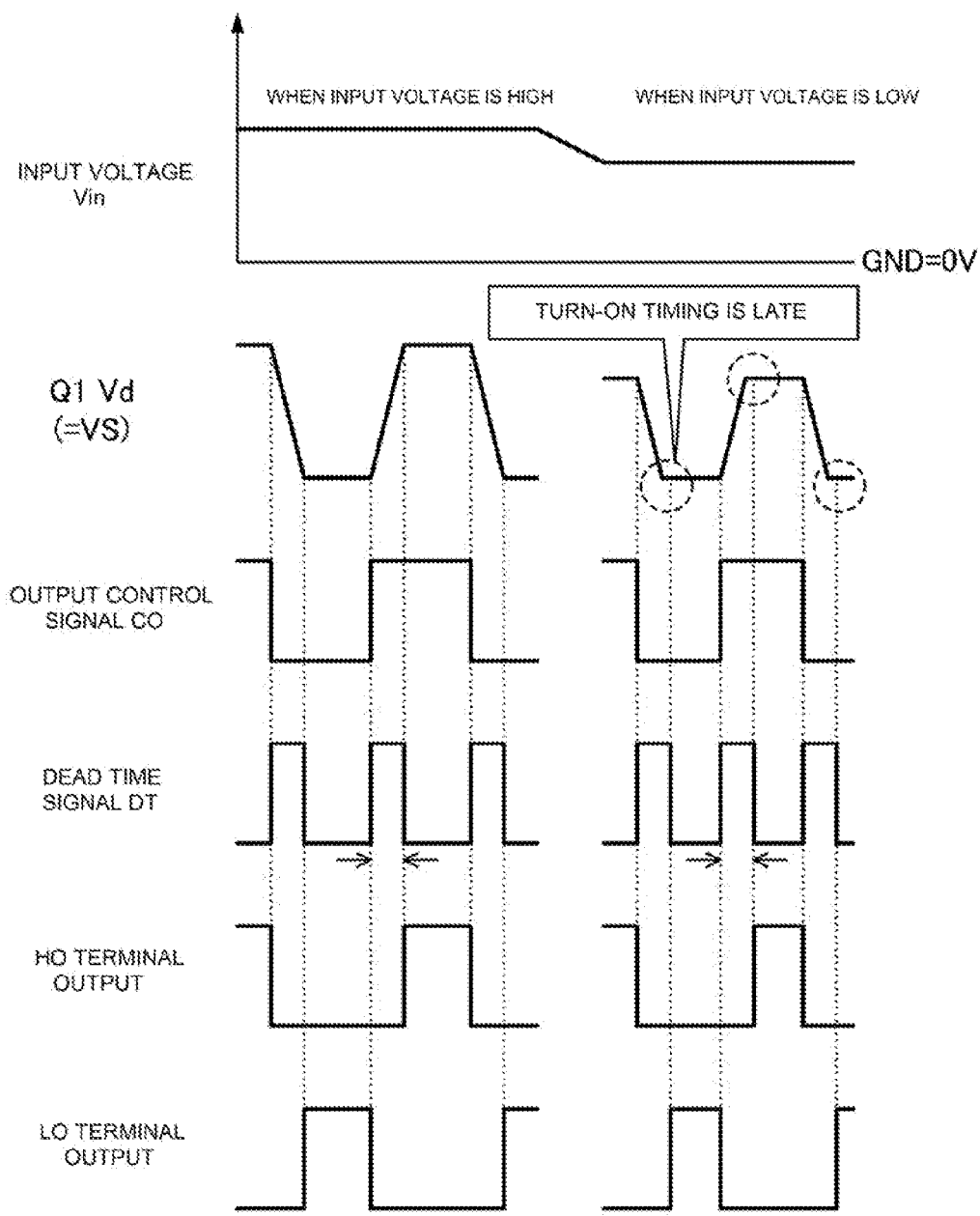
FIG. 17 is a signal waveform diagram for illustrating a problem when the operating reference potential of a second switching element Q2 decreases.
Figure 18:
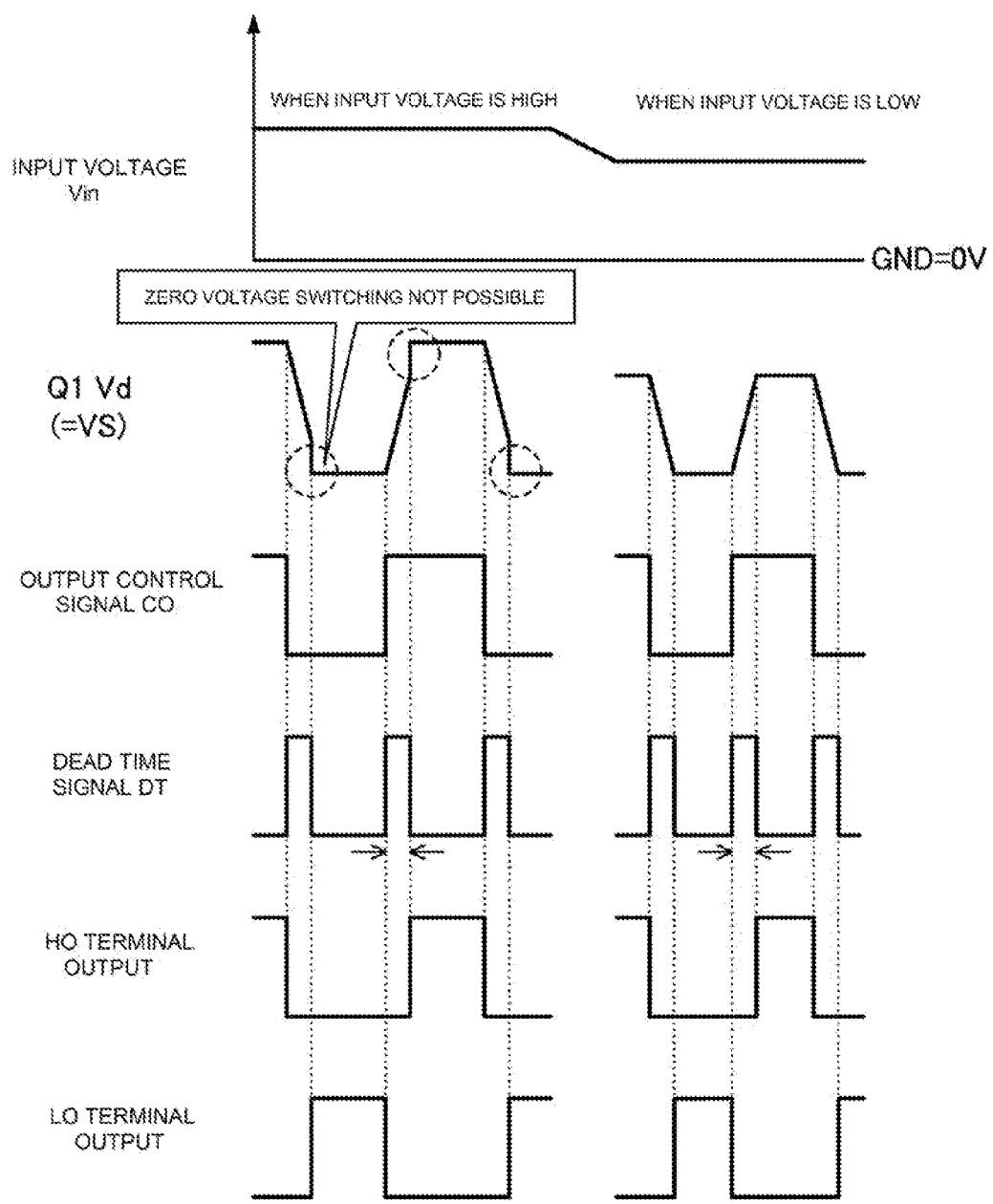
FIG. 18 is a signal waveform diagram for illustrating a problem when the operating reference potential of the second switching element Q2 increases.

That is, the level shifter circuit 7 is basically configured in the same way as the level shifter circuit 7 shown in FIG. 15. However, the level shifter circuit 7 according to this embodiment is configured so that a set signal PS and a reset signal PE, which are pulse signals output by rising edge trigger circuits 7e and 7g respectively, are applied to the gates of the first and second transistors 7c and 7d via resistors 7m and 7n respectively. That is, the level shifter circuit 7 differs from the heretofore known level shifter circuit 7 shown in FIG. 15 in that gate voltages Vg1 and Vg2 of the first and second transistors 7c and 7d are detected.

The gate voltages Vg1 and Vg2 of the first and second transistors 7c and 7d detected by the resistors 7a and 7b are selectively input into the comparator 9 via analog switches 9a and 9b, and compared with the first and second threshold values Vth1 and Vth2. When the gate voltages Vg1 and Vg2 selectively input via the analog switches 9a and 9b are between the first threshold value Vth1 and second threshold value Vth2 (>Vth1), the comparator 9 maintains the output signal CP thereof at "L". Also, when the gate voltages Vg1 and Vg2 drop below the first threshold value Vth1, or when they exceed the second threshold value Vth2, the comparator 9 inverts the output signal CP thereof to "H". The converter 9 that carries out an inverting operation in this way is formed of a so-called window comparator.

The analog switches 9a and 9b receive the drive signal (high side output signal) DH and carry out turn-on and turn-off operations in a complementary way, and as such, select the gate voltage Vg2 of the second transistor 7d when the drive signal DH is at "H". Also, the analog switches 9a and 9b select the gate voltage Vg1 of the first transistor 7c when the drive signal DH is at "L". The gate voltages Vg1 and Vg2 selected via the analog switches 9a and 9b are input into the comparator 9, and made available for comparison with the first and second threshold values Vth1 and Vth2.

Figure 2:
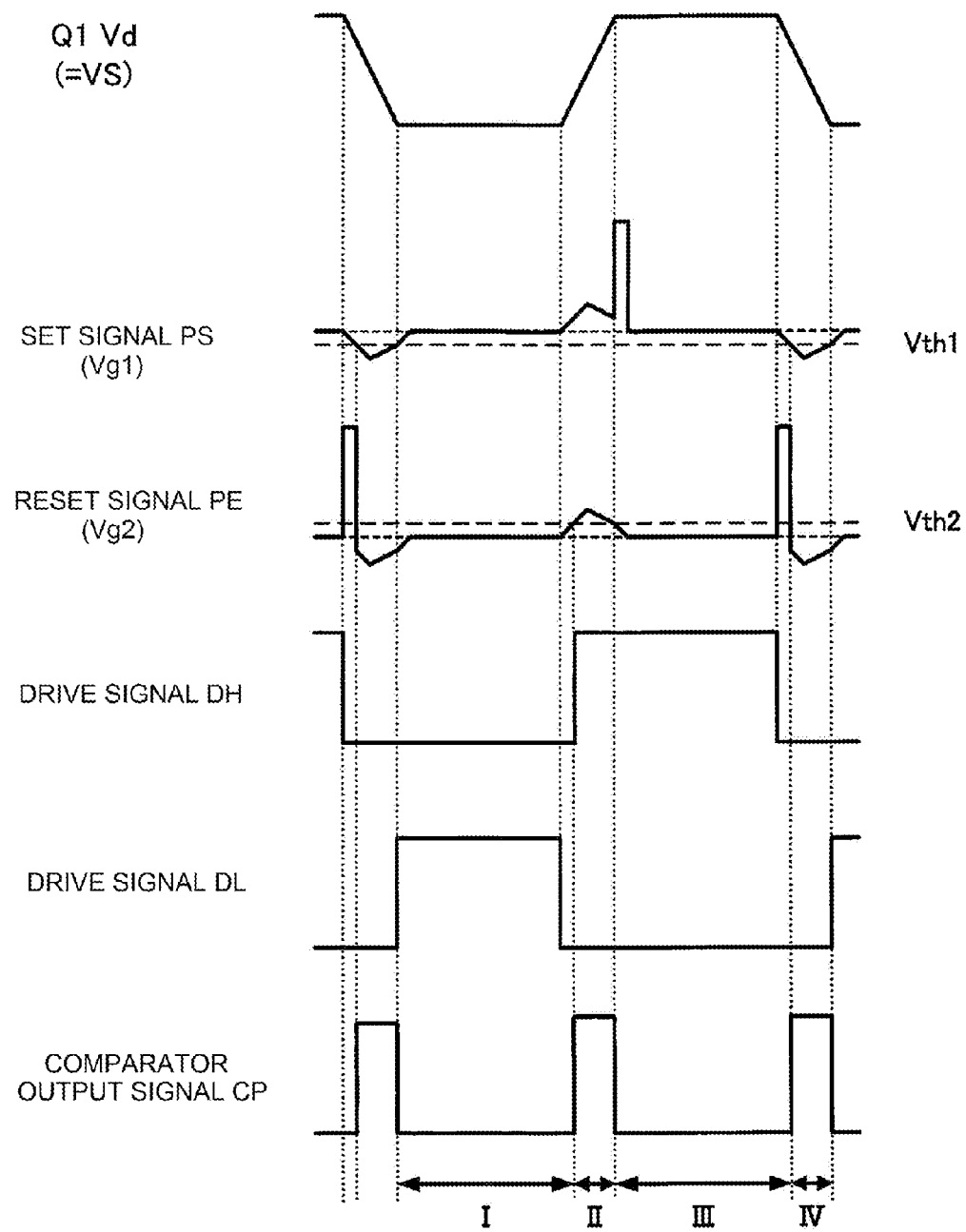
FIG. 2 is a signal waveform diagram for illustrating an operation of the level shifter circuit and a comparator shown in FIG. 1.

Consequently, the drive signal DH is maintained at "L" when the first switching element Q1 is in an on-state, as in an operation thereof shown in FIG. 2, because of which the comparator 9 selects the gate voltage Vg1 of the first transistor 7c via the analog switch 9a, and compares the gate voltage Vg1 with the first and second threshold values Vth1 and Vth2 (operation period I). When the first switching element Q1 is turned off in this state, an unshown parasitic capacitor of the first switching element Q1 is charged by current flowing through an inductor of a series resonant circuit. At the same time, an unshown parasitic capacitor of the second switching element Q2 is discharged by the current (operation period II). The current at this time oscillates due to the resonance action of the series resonant circuit.

Thereupon, the drain voltage of each of the first and second transistors 7c and 7d, that is, the operating reference potential VS of the second switching element Q2, being affected by the resonance current when the first switching element Q1 is turned off, oscillates with the timings at which the orientation of the resonance current inverts as the bottom and peak. Further, the gate voltages Vg1 and Vg2 of the transistors 7c and 7d also fluctuate in accompaniment to the oscillation of the operating reference potential VS, which is the drain voltage.

The comparator 9 compares the gate voltage Vg2 of the second transistor 7d at this time with the first and second threshold values Vth1 and Vth2. Then, when the gate voltage Vg2 exceeds the second threshold value Vth2, the comparator 9 inverts the output signal CP thereof to "H". The output timing, and the output pulse width, of the output signal CP from the comparator 9 vary in accordance with the amount of fluctuation in the gate voltage Vg2.

Also, as the drive signal DH is at "H" when the second switching element Q2 is driven on, the gate voltage Vg1 of the first transistor 7c is input via the analog switch 9a into the comparator 9, and compared with the first and second threshold values Vth1 and Vth2 (operation period III). When the second switching element Q2 is turned off in this state, current flowing through an inductor of the series resonant circuit is inverted, whereby a parasitic capacitor of the second switching element Q2 is charged. At the same time, a parasitic capacitor of the first switching element Q1 is discharged by the current (operation period IV).

Thereupon, the drain voltage of each of the first and second transistors 7c and 7d, being affected by the resonance current when the second switching element Q2 is turned off, fluctuates. Further, the gate voltages Vg1 and Vg2 of the transistors 7c and 7d fluctuate in accompaniment to the fluctuation of the drain voltage. The comparator 9 compares the gate voltage Vg1 of the first transistor 7c with the first and second threshold values Vth1 and Vth2, and inverts the output signal CP thereof to "H" when the gate voltage Vg1 drops below the first threshold value Vth1. The output timing, and the output pulse width, of the output signal CP from the comparator 9 vary in accordance with the amount of fluctuation in the gate voltage Vg1.

When there is a small amount of fluctuation in the drain voltage of the first and second transistors 7c and 7d when the first and second switching elements Q1 and Q2 are turned off, the output signal CP of the comparator 9 does not invert to "H". Also, the output signal CP of the comparator 9 does not invert to "H" either when the gate voltages Vg1 and Vg2 of the transistors 7c and 7d do not deviate from the allowable fluctuation range prescribed by the first and second threshold values Vth1 and Vth2 of the comparator 9. In other words, when there is no depreciation in the characteristics or variation in the characteristics of components such as the first and second switching elements Q1 and Q2, and fluctuation in the operating reference potential VS of the second switching element Q2 is small, the output signal CP is not output.

Meanwhile, the drive signal generator circuit 4 is configured so that the output signal CP of the comparator 9 is input in addition to the output control signal CO and the dead time signal DT, and a logical operation is carried out on the signals CO, DT, and CP, thus generating the previously described low side and high side drive signals DL and DH. In particular, the drive signal generator circuit 4 changes the output timing of the drive signals DL and DH in accordance with the presence or absence of the output signal CP, and in particular, in accordance with the pulse width of the output signal CP.

Figure 3:
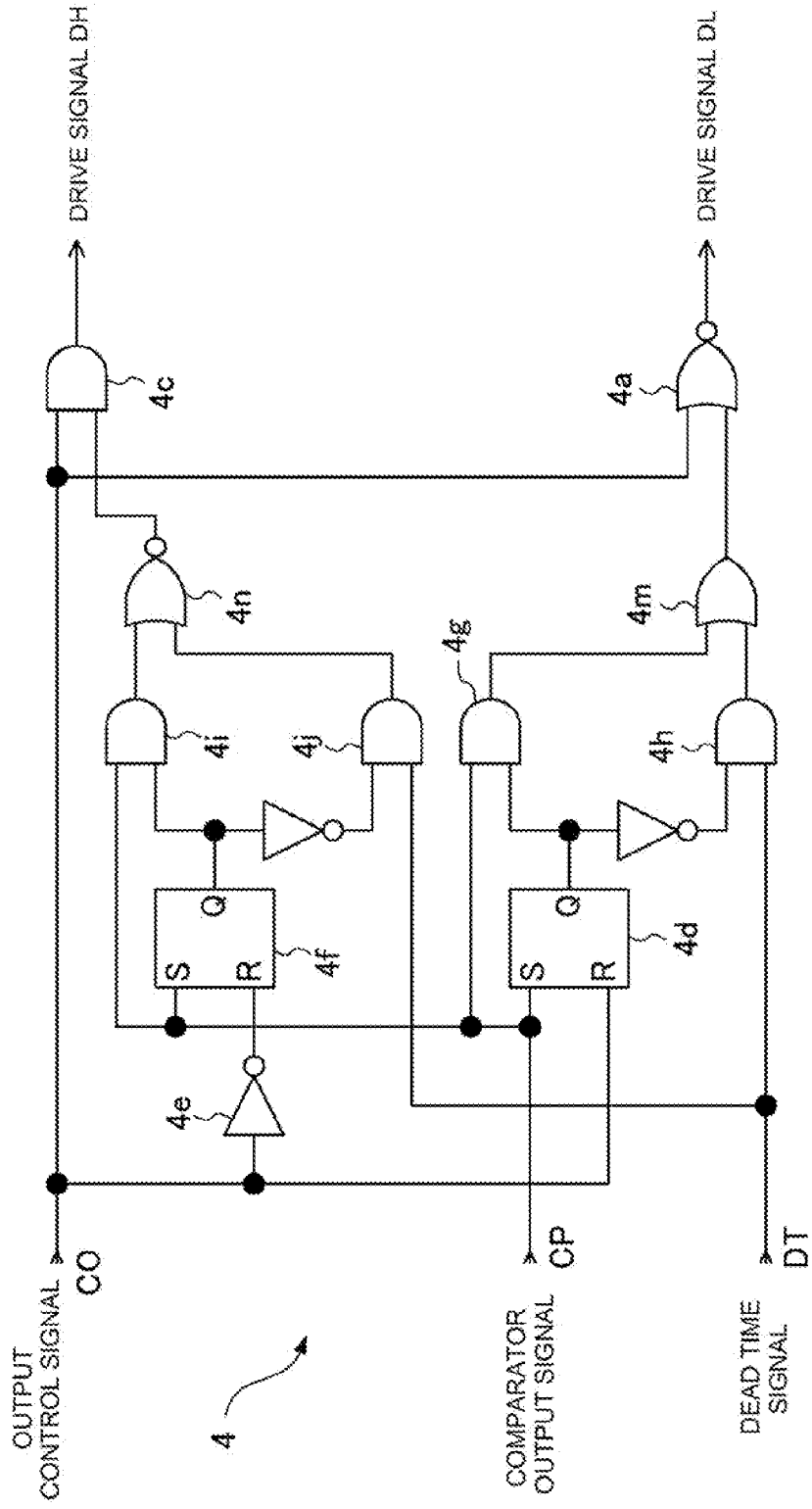
FIG. 3 is a diagram showing a configuration example of a drive signal generator circuit shown in FIG. 1.

Specifically, the drive signal generator circuit 4 includes a first flip-flop 4d, which is set by the output signal CP of the comparator 9 and reset by the output control signal CO, as shown in, for example, FIG. 3. Also, the drive signal generator circuit 4 includes a second flip-flop 4f, which is set by the output signal CP of the comparator 9 and reset by the output control signal CO inverted via an inverter circuit 4e.

The first flip-flop 4d performs a role of alternatively activating two gate circuits 4g and 4h with the output of the first flip-flop 4d, thus selecting the output signal CP of the comparator 9 or the dead time signal DT. Then, the output signal CP of the comparator 9 or the dead time signal DT selected via the gate circuits 4g and 4h is provided via an OR circuit 4m to a NOR circuit 4a. The low side drive signal DL is generated by the NOR circuit 4a.

Also, the second flip-flop 4f performs a role of alternatively activating two gate circuits 4i and 4j with the output of the second flip-flop 4f, thus selecting the output signal CP of the comparator 9 or the dead time signal DT. Then, the output signal CP of the comparator 9 or the dead time signal DT selected via the gate circuits 4i and 4j is inverted via a NOR circuit 4n corresponding to an inverter circuit 4b, and provided to an AND circuit 4c. The high side drive signal DH is generated by the AND circuit 4c.

That is, when the output signal CP is provided from the comparator 9, the drive signal generator circuit 4 sets the first and second flip-flops 4d and 4f. By the first and second flip-flops 4d and 4f being set, the drive signals DL and DH are generated in synchronization with the fall of the output signal CP. Also, when the output signal CP from the comparator 9 is not provided, the drive signal generator circuit 4 maintains the first and second flip-flops 4d and 4f in a reset state. As a result of this, the first and second flip-flops 4d and 4f generate the low side drive signal DL or high side drive signal DH in synchronization with the fall of the dead time signal DT.

Figure 4:
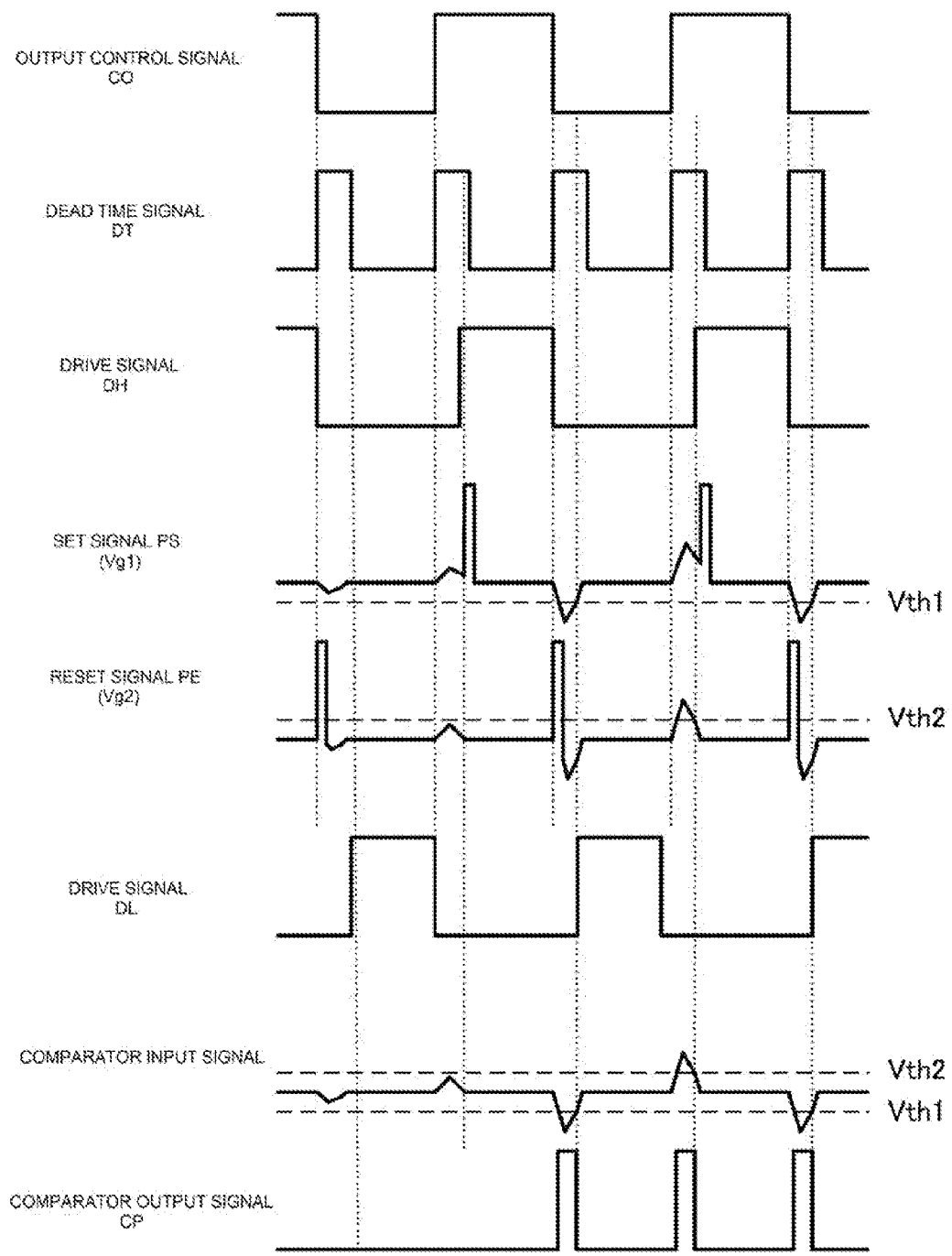
FIG. 4 is a signal waveform diagram showing an operation of a drive control circuit according to the first embodiment of the invention.

Consequently, the drive control circuit A, as in an operation timing thereof shown in FIG. 4, outputs drive signals DL and DH synchronized with the fall of the dead time signal DT when the output signal CP is not provided, thereby turning on the first and second switching elements Q1 and Q2. However, when the output signal CP is output due to fluctuation in the operating reference potential VS of the second switching element Q2, the drive signal generator circuit 4 outputs drive signals DL and DH synchronized with the fall of the output signal CP. The timing at which the first and second switching elements Q1 and Q2 are turned on is changed in accordance with the amount of fluctuation in the operating reference potential VS by the drive signals DL and DH synchronized with the fall of the output signal CP. Therefore, according to the drive control circuit A with the heretofore described configuration, it is possible to appropriately adjust the timing at which the first and second switching elements Q1 and Q2 are turned on in accordance with the amount of fluctuation in the operating reference potential VS of the second switching element Q2.

Consequently, according to the switching power supply device 1 with the heretofore described configuration, it is possible to appropriately set the timing at which the first and second switching elements Q1 and Q2 are turned on, regardless of fluctuation in the operating reference potential VS of the second switching element Q2 caused by temporal change of components, or variation in the characteristics, of the switching power supply device 1. Therefore, it is possible to minimize ineffective time during power conversion in the switching elements Q1 and Q2, and thus possible to reduce loss in the switching elements Q1 and Q2, increasing power conversion efficiency.

Moreover, the drive control circuit A is such that the amount of fluctuation in the operating reference potential VS of the second switching element Q2 is monitored, focusing on the gate voltages Vg1 and Vg2 of the transistors 7c and 7d in the level shifter circuit 7. Further, the timing of the output of the drive signals DL and DH to the first and second switching elements Q1 and Q2 is adjusted when there is a large amount of fluctuation in the operating reference potential VS. Consequently, it is possible to increase power conversion efficiency with a simple configuration. Moreover, circuit integration of the drive control circuit A including the comparator 9 is easy, which has a large number of practical advantages. Furthermore, there are advantages such as it also being possible to considerably relax the design specifications of the dead time signal accompanying an increase in switching frequency.

Herein, in the first embodiment, the amount of fluctuation in the operating reference potential VS of the second switching element Q2 is monitored, focusing on the gate voltages Vg1 and Vg2 of the first and second transistors 7c and 7d in the level shifter circuit 7. However, it is also possible to divide the operating reference potential VS with resistors, and directly monitor the amount of fluctuation in the operating reference potential VS in the comparator 9, as shown in, for example, FIG. 5.

Figure 5:
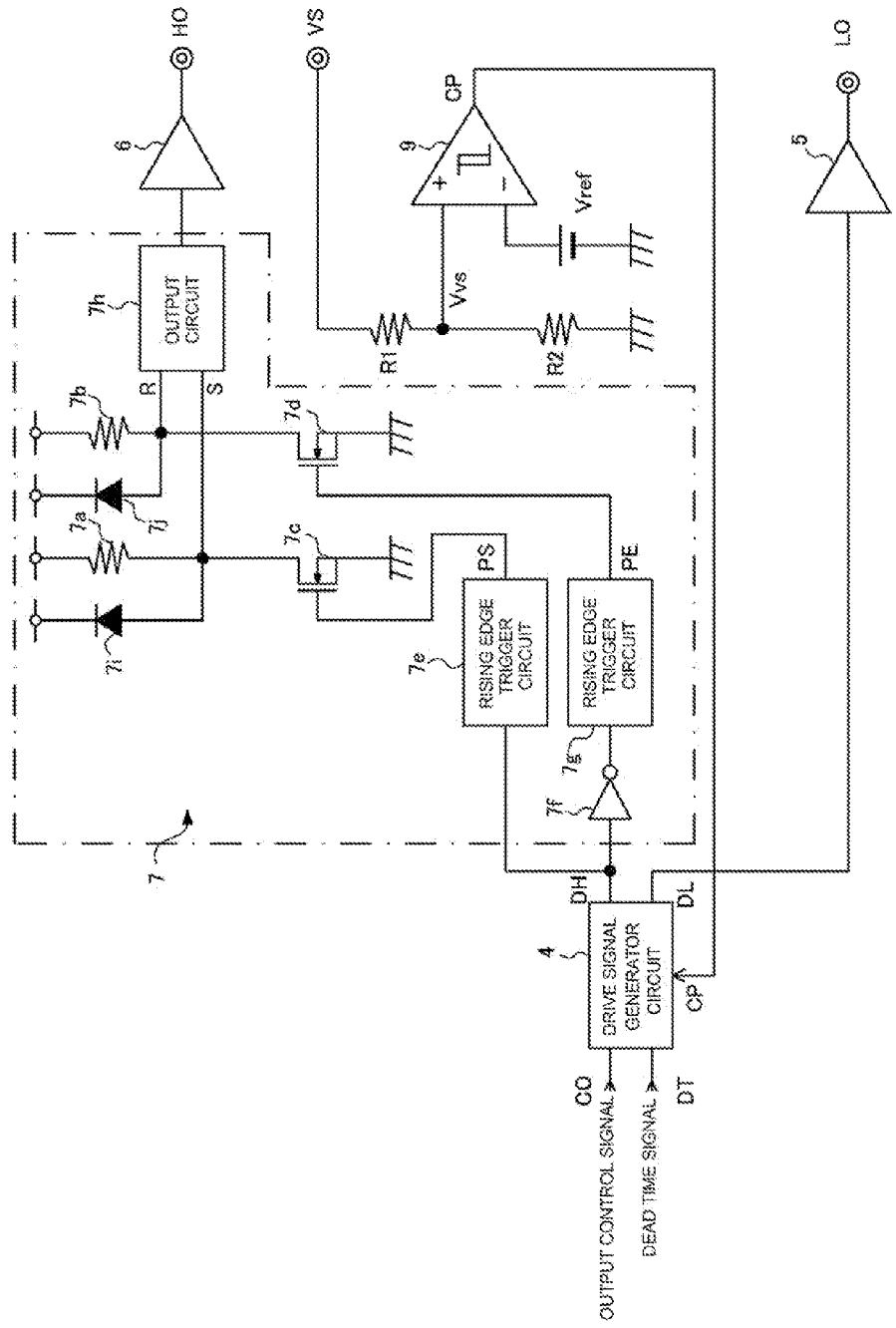
FIG. 5 is a diagram wherein a characteristic configuration of a switching power supply device according to a second embodiment of the invention is extracted, showing a level shifter circuit in a drive control circuit, and peripheral circuits thereof.

FIG. 5 is a characteristic configuration portion of a switching power supply device according to a second embodiment of the invention, and shows a configuration of the level shifter circuit 7 and peripheral circuits thereof. The second embodiment is characterized in that the operating reference potential VS of the second switching element Q2 is divided by serially connected voltage divider resistors R1 and R2, and detected. Further, the configuration is such that a detected VS detection voltage Vvs and the first threshold value Vth1 and second threshold value Vth2 (>Vth1) prescribed by the preset reference voltage Vref are compared by the comparator 9.

Figure 6:
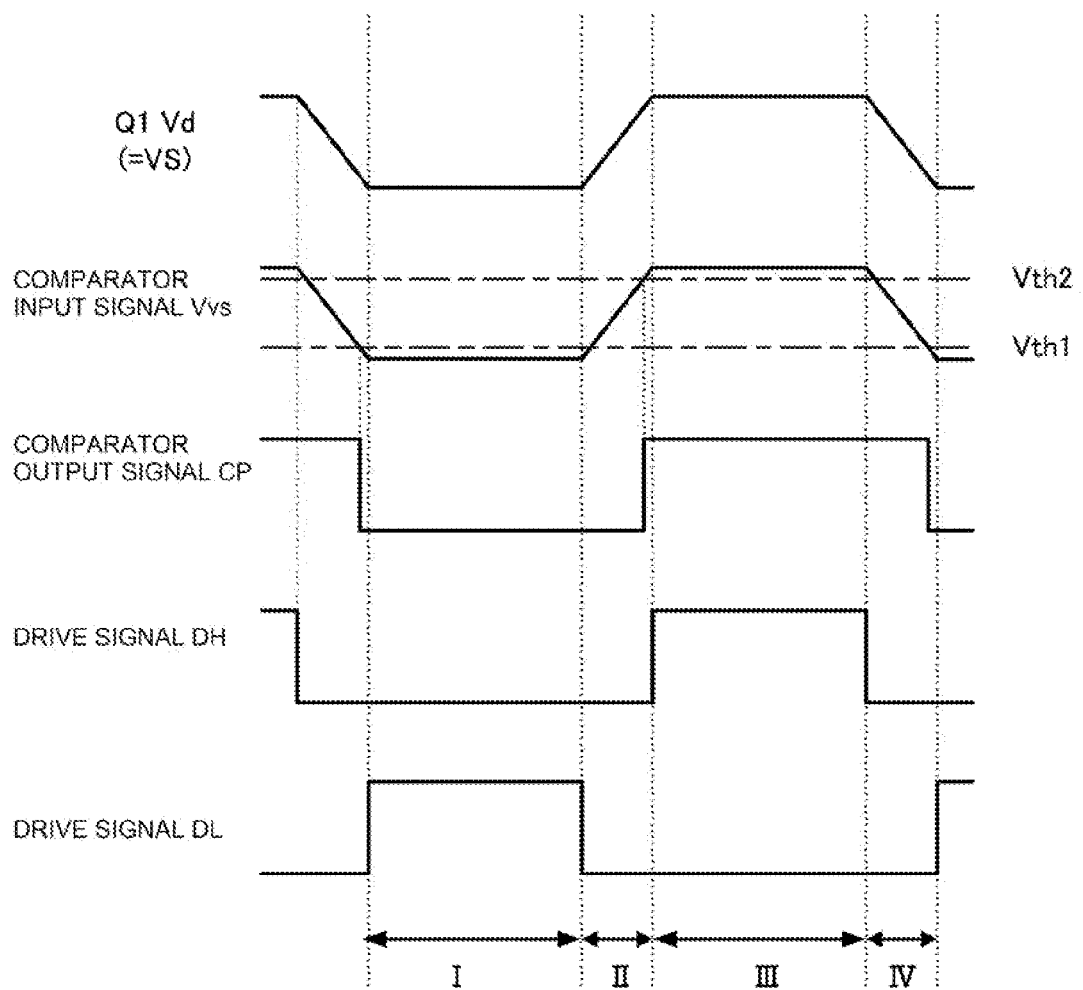
FIG. 6 is a signal waveform diagram for illustrating an operation of a comparator shown in FIG. 5.

The comparator 9 is formed of a so-called Schmitt trigger comparator that inverts the output thereof to "H" when the VS detection voltage Vvs exceeds the second threshold value Vth2, and inverts the output to "L" when the VS detection voltage Vvs subsequently drops below the first threshold value Vth1. Consequently, the comparator, as in an operation waveform diagram thereof shown in FIG. 6, outputs the output signal CP at the "H" level from the timing at which the VS detection voltage Vvs exceeds the second threshold value Vth2 until the timing at which the VS detection voltage Vvs drops below the first threshold value Vth1.

That is, the VS detection voltage Vvs fluctuates in accompaniment to fluctuation in the operating reference potential VS of the second switching element Q2. When the timing at which the VS detection voltage Vvs exceeds the second threshold value Vth2 is earlier than the timing specified by the drive signal DH at which the second switching element Q2 is turned on, the comparator 9 inverts the output signal CP thereof to "H" at the timing at which the VS detection voltage Vvs exceeds the second threshold value Vth2.

In the same way, when the timing at which the VS detection voltage Vvs drops below the first threshold value Vth1 is earlier than the timing specified by the drive signal DL at which the first switching element Q1 is turned on, the comparator 9 inverts the output signal CP thereof to "H" at the timing at which the VS detection voltage Vvs drops below the first threshold value Vth1.

Figure 7:
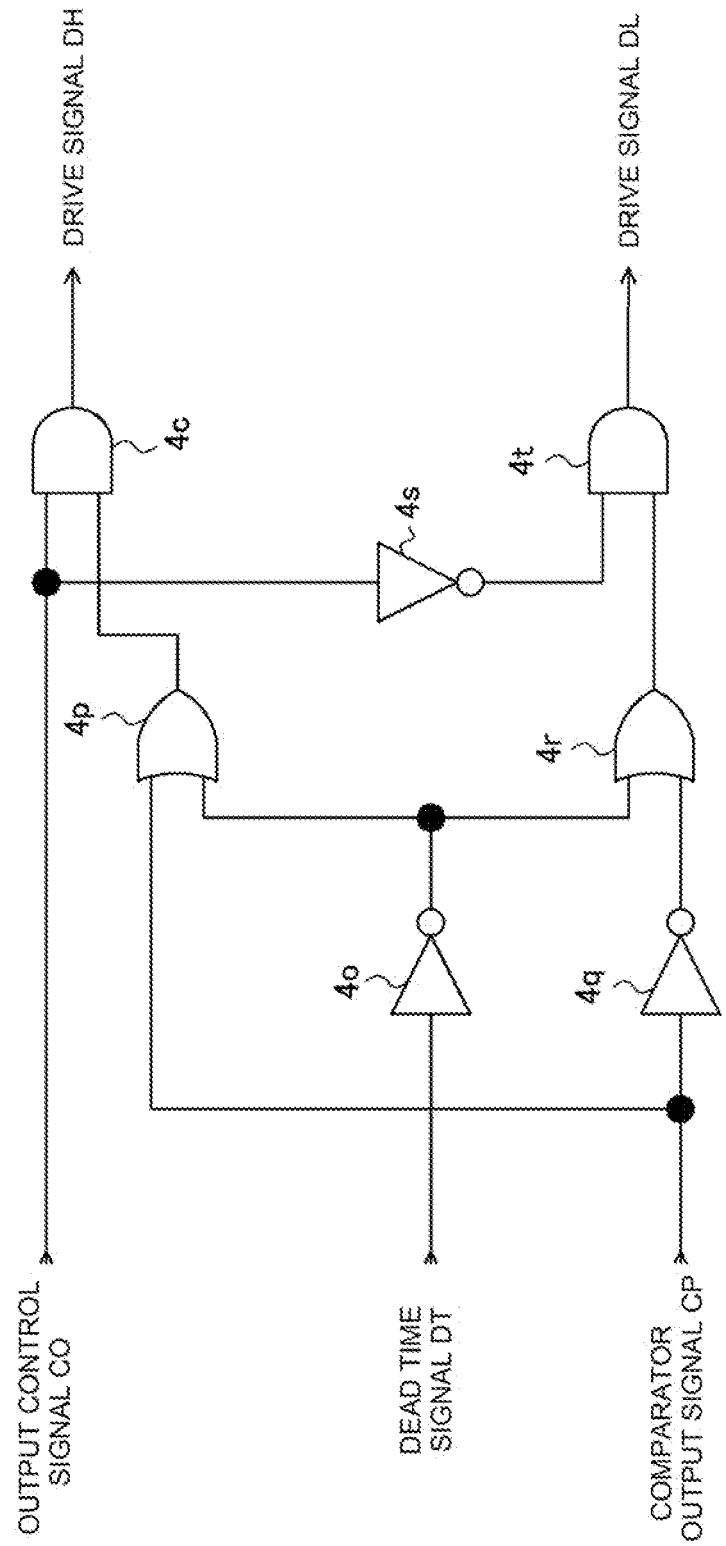
FIG. 7 is a diagram showing a configuration example of a drive signal generator circuit shown in FIG. 5.

Also, the drive signal generator circuit 4 into which this kind of comparator 9 output signal CP is input, and which generates the drive signals DH and DL, is configured as shown in, for example, FIG. 7. That is, the drive signal generator circuit 4 according to the second embodiment includes a first OR circuit 4p that carries out a logical operation on the output signal CP from the comparator 9 and the dead time signal DT inverted via an inverter circuit 4o. Furthermore, the drive signal generator circuit 4 includes a second OR circuit 4r that carries out a logical operation on the output signal CP inverted via an inverter circuit 4q and the dead time signal DT inverted via the inverter circuit 4o. Further, the drive signal generator circuit 4 is such that a logical operation is carried out on the output of the first OR circuit 4p and the output control signal CO in the AND circuit 4c, thereby generating the drive signal DH. Also, the drive signal generator circuit 4 is such that the drive signal DL is generated by a logical operation being carried out in an AND circuit 4t on the output of the second OR circuit 4r and the output control signal CO inverted via an inverter circuit 4s.

Figure 8:
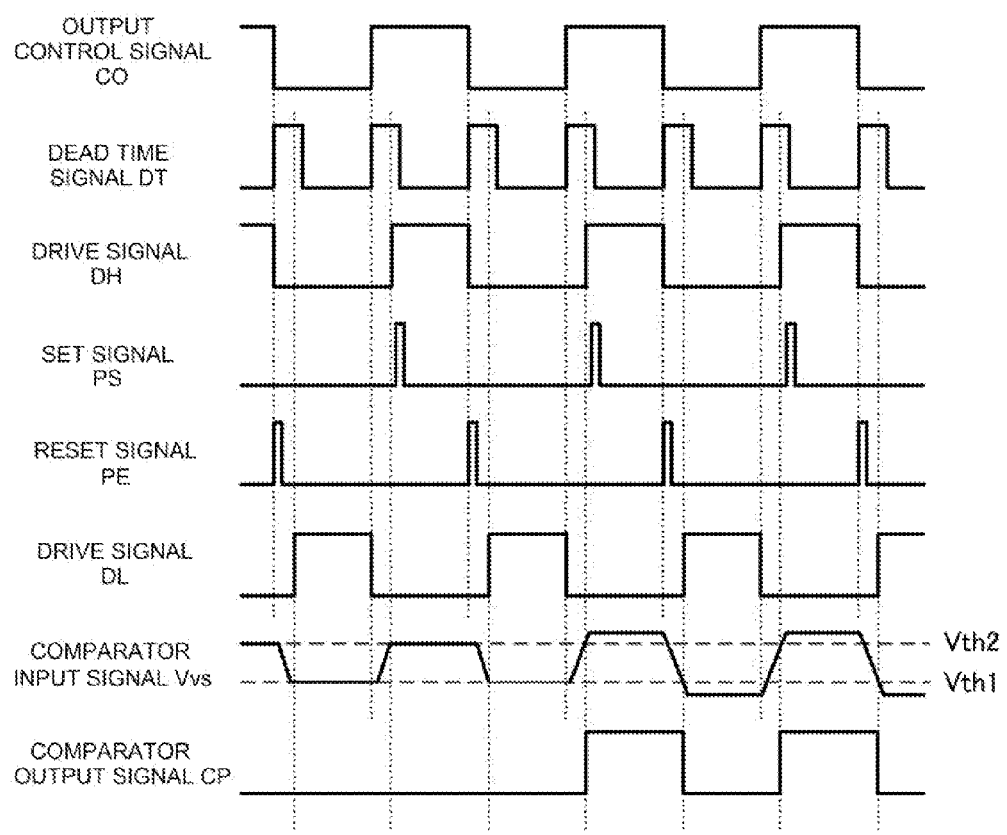
FIG. 8 is a signal waveform diagram showing an operation of a drive control circuit according to the second embodiment of the invention.

According to the drive signal generator circuit 4 configured in this way, when there is a small amount of fluctuation in the operating reference potential VS of the second switching element Q2, and no output signal CP is provided from the comparator 9, the drive signal generator circuit 4 outputs drive signals DL and DH synchronized with the fall of the dead time signal DT, as in an operation waveform diagram thereof shown in FIG. 8, thereby turning on the first and second switching elements Q1 and Q2.

When there is a small amount of fluctuation in the operating reference potential VS of the second switching element Q2, and the output signal CP is provided from the comparator 9, the drive signal generator circuit 4 outputs the drive signal DL in synchronization with the fall of the output signal CP instead of the dead time signal DT. Also, the drive signal generator circuit 4 outputs the drive signal DH in synchronization with the rise of the output signal CP, thereby turning on each of the first and second switching elements Q1 and Q2. Consequently, according to the drive control circuit A with the heretofore described configuration, it is possible to appropriately adjust the timing at which the first and second switching elements Q1 and Q2 are turned on in accordance with the amount of fluctuation in the operating reference potential VS of the second switching element Q2.

As a result of this, according to the switching power supply device 1 with the heretofore described configuration, it is possible to appropriately set the timing at which the first and second switching elements Q1 and Q2 are turned on, regardless of fluctuation in the operating reference potential VS of the second switching element Q2 caused by temporal change of components or variation in the characteristics, in the same way as in the first embodiment. Consequently, it is possible to minimize ineffective time during power conversion in the switching elements Q1 and Q2, and thus possible to reduce loss in the switching elements Q1 and Q2, increasing power conversion efficiency.

Moreover, the amount of fluctuation in the operating reference potential VS of the second switching element Q2 is monitored directly by dividing with resistors, and the timing of the output of the drive signals DL and DH to the first and second switching elements Q1 and Q2 is adjusted when there is a large amount of fluctuation. Consequently, it is possible to increase power conversion efficiency with a simple configuration. Therefore, circuit integration of the drive control circuit A including the comparator 9 is easy, which has a large number of practical advantages. Furthermore, there are advantages such as it also being possible to considerably relax the design specifications of the dead time signal accompanying an increase in switching frequency.

Figure 9:
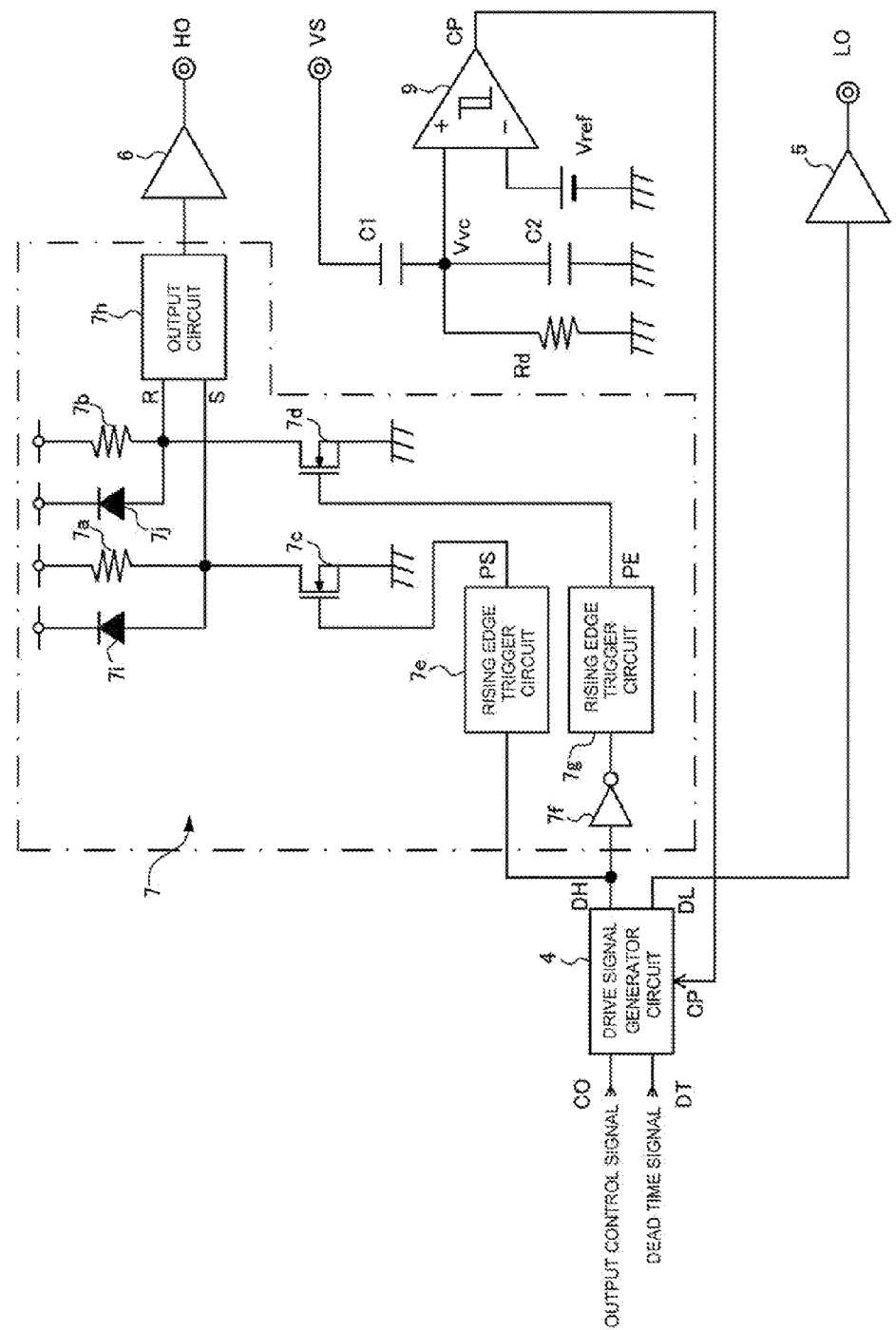
FIG. 9 is a diagram wherein a characteristic configuration of a switching power supply device according to a third embodiment of the invention is extracted, showing a level shifter circuit in a drive control circuit, and peripheral circuits thereof.

FIG. 9 is a characteristic configuration portion of a switching power supply device according to a third embodiment of the invention, and shows a configuration of the level shifter circuit 7 and peripheral circuits thereof. The third embodiment is characterized in that the operating reference potential VS of the second switching element Q2 is divided by serially connected capacitors C1 and C2, and detected. Further, the configuration is such that a VS detection voltage Vvc, detected after division by the capacitors, and the first threshold value Vth1 and second threshold value Vth2 (>Vth1) prescribed by the preset reference voltage Vref are compared by the comparator 9.

Figure 10:
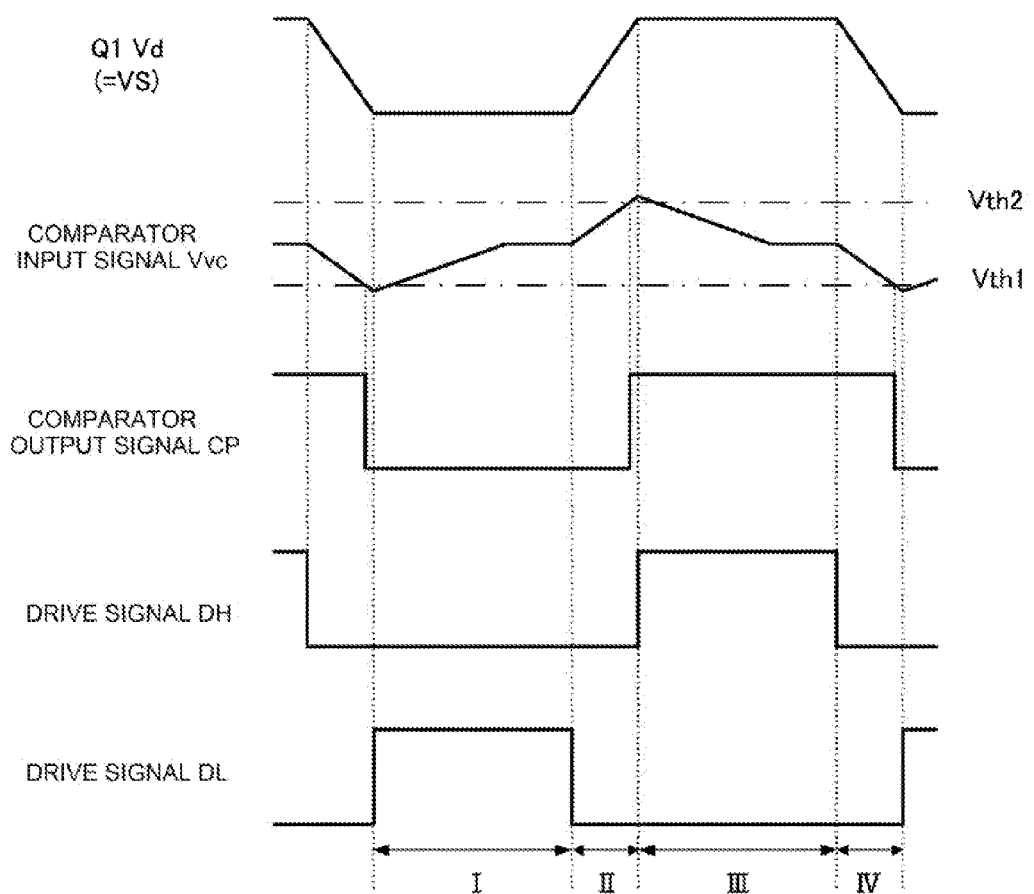
FIG. 10 is a signal waveform diagram for illustrating an operation of a comparator shown in FIG. 9.

A discharge resistor Rd is connected in parallel with the capacitor C2. Consequently, the VS detection voltage Vvc detected after division by the capacitors C1 and C2 changes in accordance with operations turning the first and second switching elements Q1 and Q2 on and off so as to stabilize at a constant voltage, as shown in FIG. 10. In particular, the VS detection voltage Vvc, after changing in accordance with a turning off of the first and second switching elements Q1 and Q2 from a stable state fixed by the capacitance ratio of the capacitors C1 and C2, changes so as to return to the stable state. Further, when the operating reference potential VS fluctuates, the range of the change from the stable state increases in accordance with the amount of fluctuation.

The comparator 9 that detects this kind of range of change in the VS detection voltage Vvc as the amount of fluctuation in the operating reference potential VS is formed of the same kind of Schmitt trigger comparator as the comparator 9 shown in the second embodiment. Further, the comparator 9, as in an operation waveform diagram thereof shown in FIG. 10, outputs the output signal CP at the "H" level from the timing at which the VS detection voltage Vvc detected after division by the capacitors exceeds the second threshold value Vth2 until the timing at which the VS detection voltage Vvc drops below the first threshold value Vth1.

That is, the VS detection voltage Vvc fluctuates in accompaniment to fluctuation in the operating reference potential VS of the second switching element Q2. Further, when the timing at which the VS detection voltage Vvc exceeds the second threshold value Vth2 is earlier than the timing specified by the drive signal DH at which the second switching element Q2 is turned on, the comparator 9 inverts the output signal CP thereof to "H" at the timing at which the VS detection voltage Vvc exceeds the second threshold value Vth2.

In the same way, when the timing at which the VS detection voltage Vvc drops below the first threshold value Vth1 is earlier than the timing specified by the drive signal DL at which the first switching element Q1 is turned on, the comparator 9 inverts the output signal CP thereof to "H" at the timing at which the VS detection voltage Vvc drops below the first threshold value Vth1.

The drive signal generator circuit 4 into which this kind of comparator 9 output signal CP is input, and which generates the drive signals DH and DL, is configured in the same way as the drive signal generator circuit 4 shown in FIG. 7 according to the second embodiment. Consequently, when configuring so that the VS detection voltage Vvc, which is the operating reference potential VS of the second switching element Q2 divided by the capacitors, is evaluated in the comparator 9, the same kinds of advantage as in the previously described second embodiment are obtained.

Herein, the first to third embodiments are applied to a switching power supply device structuring a resonance type inverter, but the invention is also applicable in the same way to a switching power supply device structuring a synchronous rectification step-up converter.

Figure 11:
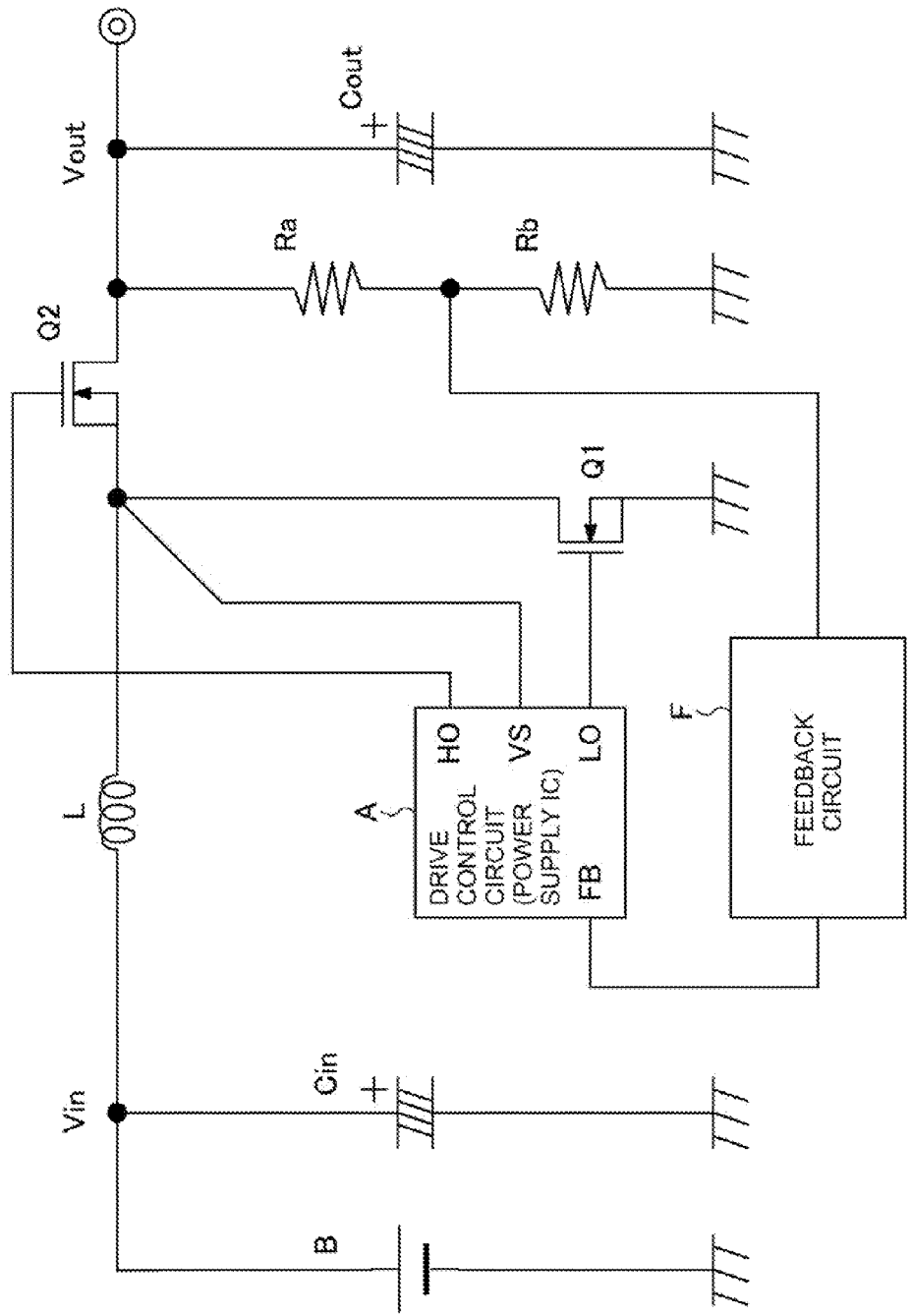
FIG. 11 is a schematic configuration diagram of a switching power supply device structuring a synchronous rectification step-up converter according to a fourth embodiment of the invention.

FIG. 11 is a schematic configuration diagram of a switching power supply device according to a fourth embodiment of the invention, wherein the switching power supply device is structured of a synchronous rectification step-up converter. The synchronous rectification step-up converter includes the first switching element Q1, connected via an inductor L to a direct current voltage supply, which stores power in the inductor L by carrying out a turn-on operation. Furthermore, the synchronous rectification step-up converter includes the second switching element Q2, which carries out a turn-on operation when the first switching element Q1 is in an off-state and, utilizing the resonance of the inductor L, transfers the power stored in the inductor L to an output capacitor Cout, whereby an output voltage Vout is obtained.

The first and second switching elements Q1 and Q2 are driven on and off in a complementary way by the drive control circuit A, in the same way as in each of the previously described embodiments. The synchronous rectification step-up converter shown in FIG. 11 is configured so that the output voltage Vout is detected after being divided via the voltage divider resistors Ra and Rb, and FB voltage fed back via a feedback circuit F formed of, for example, a photocoupler, to the drive control circuit A is generated.

A switching power supply device structuring a synchronous rectification step-up converter in this way is also such that, in order to drive the switching elements Q1 and Q2 on and off at optimum timings, thus increasing power conversion efficiency, it is necessary to optimize a pulse width Tdt of the dead time signal. This kind of problem is the same as with the previously described switching power supply device structuring a resonance type inverter. Consequently, the drive control circuit A in this embodiment is also configured to include the same kind of window type or Schmitt trigger type of comparator 9 as the comparators 9 shown in the first to third embodiments. Further, the drive control circuit A is realized by including the drive signal generator circuit 4 configured as shown in FIG. 3 or FIG. 7, configured in accordance with these comparators 9.

A switching power supply device configured in this way is such that the amount of fluctuation in the operating reference potential VS of the second switching element Q2 is detected by the comparator 9. Further, the output timing of the drive signals DL and DH is adjusted by the drive signal generator circuit 4 in accordance with the amount of fluctuation in the operating reference potential VS. Because of this, it is possible to optimize the timing at which each of the switching elements Q1 and Q2 is turned on. As a result of this, ineffective time during power conversion in the first and second switching elements Q1 and Q2 is minimized, and furthermore, loss in the switching elements Q1 and Q2 is reduced, and it is thus possible to increase power conversion efficiency. Consequently, it is possible to obtain the same kinds of advantage as in each of the previously described embodiments.

The invention is not limited to the heretofore described embodiments. For example, provided that it is a switching circuit wherein the low side first switching element Q1 and high side second switching element Q2 are alternately driven on and off by the drive control circuit A, thus obtaining a voltage control output, the invention is applicable in the same way. Specifically, the invention is widely applicable as an inverter or step-up/step-down chopper circuit that drives a motor, or furthermore, as a drive control circuit of a drive circuit portion of an inverter type fluorescent light, a charge/discharge circuit portion in an uninterruptible power supply device, or the like.

Also, it is also sufficient that the first and second threshold values Vth1 and Vth2 set in the comparator 9 are determined in accordance with the characteristics of the switching elements Q1 and Q2, and the like. Also, it goes without saying that, instead of the first and second threshold values Vth1 and Vth2 being set collectively, correlated with each other, based on the reference voltage Vref, the first and second threshold values Vth1 and Vth2 may be set individually. Other than this, various modifications are possible without departing from the scope of the invention.

REFERENCE SIGNS LIST

Q1 First switching element
Q2 Second switching element
A Drive control circuit
Vos Output voltage detector circuit
1 Switching power supply device
2 Output control circuit
3 Dead time circuit
4 Drive signal generator circuit
6 Drive circuit
7 Level shifter circuit
7c, 7d Transistor (MOSFET)
9 Comparator
9a, 9b Analog switch

The invention claimed is:

1. A switching power supply for use with a DC input power source, comprising:
an inductor;
a first switching element to switch power obtained from the input power source to the inductor to store energy in the inductor;
means for generating a DC voltage from energy stored in the inductor, the means including an output capacitor;
a second switching element that cooperates with the means to transfer energy stored in the inductor to the output capacitor;
a drive control circuit that causes the inductor to resonate by alternately turning the first and second switching elements ON; and
a feedback circuit that detects an output voltage across the output capacitor and returns detection information to the drive control circuit to control operation of the drive control circuit,
wherein the drive control circuit includes:
a comparator that detects fluctuation in an operating reference potential of the second switching element accompanying fluctuation in the voltage of the input power source;
an output control circuit that generates an output control signal having a pulse width in accordance with the detection information returned from the feedback circuit;
a dead time circuit that, with a first timing at which one of the first and second switching elements is turned OFF based on the output control signal as a reference, generates a dead time signal that determines a second timing at which the other switching element is turned ON;
a drive signal generator circuit that carries out a logical operation on the output control signal and dead time signal and the output signal of the comparator, and generates first and second drive signals that determine the ON-state times of the first and second switching elements;
a level shifter circuit that shifts a level of the second drive signal in accordance with the operating reference potential of the second switching element;
a first drive circuit that receives the first drive signal and drives the first switching element; and
a second drive circuit that receives the second drive signal, whose level has been shifted by the level shifter circuit, that drives the second switching element.

2. The switching power supply according to claim 1, further comprising:
an additional capacitor,
wherein the inductor is a transformer having a primary winding and at least one secondary winding, the primary winding having first and second ends,
wherein the additional capacitor connects the first end of the primary winding to the input power source and forms a series resonant circuit with the transformer,
wherein the first switching element, driven by the drive control circuit, applies an input voltage from the input power source to the series resonant circuit when in an ON-state;
wherein the second switching element is connected to the second end of the primary winding and thus in parallel to the series resonant circuit, the second switching element being driven on by the drive control circuit when the first switching element is in an OFF-state, thus forming a current path of the series resonant circuit, and wherein the means additionally includes a rectifying circuit that is connected to the at least one secondary winding and to the output capacitor.

3. The switching power supply according to claim 1, wherein the switching power supply comprises a synchronous rectification step-up converter, wherein the inductor is a resonance reactor, wherein the first switching element is connected via the resonance reactor to input power source and is driven by the drive control circuit, the first switching element applying an input voltage from the input power source to the resonance reactor when in an ON-state; and wherein the second switching element is driven on by the drive control circuit when the first switching element is in an OFF-state and transfers electric power energy accumulated in the resonance reactor to the output capacitor.

4. The switching power supply device according to claim 1, wherein the comparator is a Schmitt trigger comparator and switches the output thereof to "H" when the operating reference potential of the second switching element exceeds a first threshold value and switches the output thereof to "L" when the operating reference potential of the second switching element drops below a second threshold value set lower than the first threshold value, wherein the output signal generator circuit comprises a logic circuit that, when the output signal of the comparator is at "L", generates a first output signal with a pulse width having the fall of the dead time signal as a turn-on trigger and the rise of the output control signal as a turn-off trigger, and that generates a second output signal with a pulse width having the fall of the output signal of the comparator as a turn-on trigger and the rise of the output control signal as a turn-off trigger, and wherein when the output signal of the comparator is at "H", the logic circuit generates a first output signal with a pulse width having the rise of the output signal of the comparator as a turn-on trigger and the rise of the output control signal as a turn-off trigger, and generates a second output signal with a pulse width having the fall of the output signal of the comparator as a turn-on trigger and the rise of the output control signal as a turn-off trigger.

5. The switching power supply device according to claim 4, wherein the level shifter circuit includes first and second MOSFETs that shift the level of the rise and fall of the second drive signal, thus transferring the logic, and wherein the comparator selects the gate voltage of one of the first and second MOSFETs, which fluctuates in accompaniment to fluctuation in the operating reference potential of the second switching element, via an analog switch selectively driven in accordance with the second drive signal, compares the selected gate voltage with the first and second threshold values, and inverts the output thereof.

6. The switching power supply device according to claim 4, wherein the comparator compares a voltage that is the operating reference potential of the second switching element divided by resistors or capacitors with the first and second threshold values, and inverts the output thereof.

* * * * *